United States Patent [19]
Ando et al.

[11] Patent Number: 5,417,190
[45] Date of Patent: May 23, 1995

[54] STRATIFIED BURNING INTERNAL COMBUSTION ENGINE

[75] Inventors: Hiromitsu Ando; Osamu Hirako; Shogo Omori, all of Okazaki; Jun Takemura, Toyota; Taizo Kitada, Okazaki; Katsuo Akishino, Okazaki; Yasuki Tamura, Okazaki; Michihiro Hata, Okazaki; Kinichi Iwachido, Nagoya; Masayuki Motomochi, Toyota; Syunsuke Matsuo, Kyoto; Nobuaki Murakami, Kyoto; Keizo Furukawa, Kyoto, all of Japan

[73] Assignee: Mitsubishi Jidosha Kogyo Kabushiki Kaisha, Tokyo, Japan

[21] Appl. No.: 25,406

[22] Filed: Feb. 26, 1993

[30] Foreign Application Priority Data

| Feb. 28, 1992 | [JP] | Japan | 4-044007 |
| Sep. 22, 1992 | [JP] | Japan | 4-253285 |
| Sep. 24, 1992 | [JP] | Japan | 4-255118 |
| Sep. 25, 1992 | [JP] | Japan | 4-256797 |
| Sep. 25, 1992 | [JP] | Japan | 4-256798 |
| Sep. 25, 1992 | [JP] | Japan | 4-256799 |
| Sep. 25, 1992 | [JP] | Japan | 4-257046 |

[51] Int. Cl.6 .................. F02B 17/00; F02B 31/00
[52] U.S. Cl. .................... 123/308; 123/430; 123/432
[58] Field of Search ............ 123/308, 430, 432, 188.14

[56] References Cited

U.S. PATENT DOCUMENTS

| 1,815,799 | 7/1931 | Raymond | |
| 4,064,849 | 12/1977 | Nagasawa | 123/188.14 |
| 4,072,134 | 2/1978 | Noguchi et al. | 123/430 |
| 4,325,333 | 4/1982 | Kato et al. | 123/260 |
| 4,550,699 | 11/1985 | Okumura et al. | 123/308 |
| 4,732,117 | 3/1988 | Tanahashi et al. | 123/568 |
| 4,751,902 | 6/1988 | August | 123/263 |
| 4,763,622 | 8/1988 | Indra et al. | 123/308 |
| 4,930,468 | 6/1990 | Stockhausen | 123/308 |
| 5,050,557 | 9/1991 | Ishida et al. | 123/308 |
| 5,237,974 | 8/1993 | Isomoto et al. | 123/432 |
| 5,245,964 | 9/1993 | Matsuo et al. | 123/308 |
| 5,273,014 | 12/1993 | Mitobe et al. | 123/308 |

FOREIGN PATENT DOCUMENTS

| 0390589 | 10/1990 | European Pat. Off. |
| 720556 | 2/1932 | France |
| 3727038 | 2/1989 | Germany |

Primary Examiner—Henry C. Yuen
Assistant Examiner—Erick Solis
Attorney, Agent, or Firm—Evenson, McKeown, Edwards & Lenahan

[57] ABSTRACT

A stratified burning internal combustion engine according to this invention is equipped with an intake port and a fuel feed device so that stratified tumble flows of different fuel concentrations can be formed in a combustion chamber. An ignition device is provided in the combustion chamber to ignite at least one of the tumble flows, said at least one tumble flow being rich in fuel. To promote the stratified tumble flows, a top wall of a piston has an inclined wall. This makes it possible to strengthen the tumble flows, whereby the stratification of an air-fuel mixture in the combustion chamber can be improved further to permit lean burn at a larger air/fuel ratio.

27 Claims, 26 Drawing Sheets

FIG.8(a) H-H
FIG.8(b) S1-S1
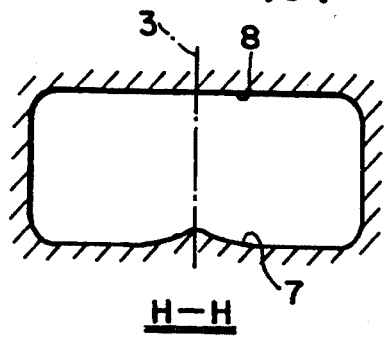
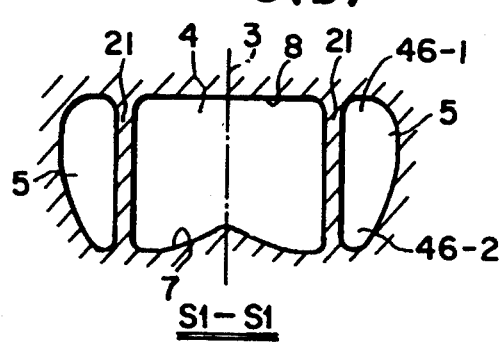
FIG.8(c) S2-S2
FIG.8(d) S3-S3
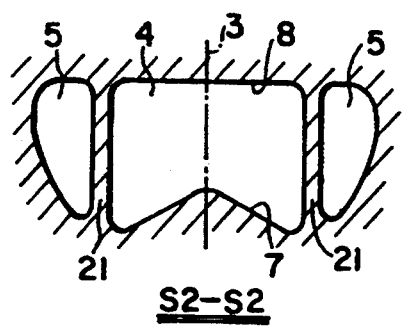
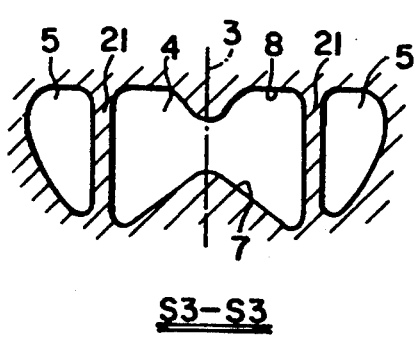
FIG.8(e) S4-S4
FIG.8(f) S5-S5
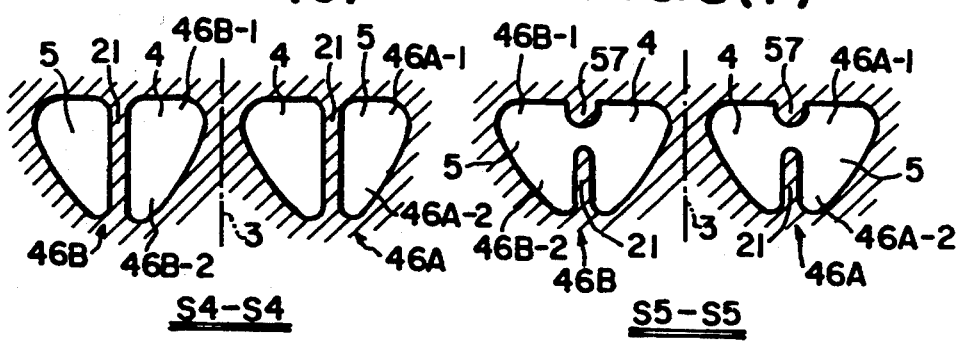
FIG.8(g) S6-S6
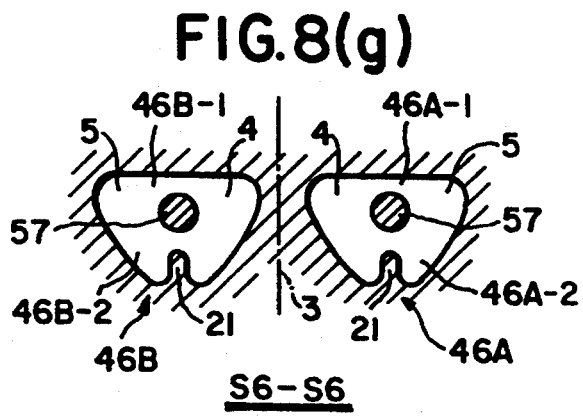

R5-R5

R6-R6

G-G

R1-R1

R2-R2

R3-R3

R4-R4

STRATIFIED BURNING INTERNAL COMBUSTION ENGINE

BACKGROUND OF THE INVENTION

1. Field of the Invention

This invention relates to a stratified burning internal combustion engine equipped with a combustion chamber and an intake port structure, which are particularly suited for stratified burning.

2. Description of the Related Art

Stratified burning internal combustion engines have been known conventionally. With a view toward permitting driving at low fuel consumption, they form a fuel-rich layer of an air-fuel mixture in a combustion chamber and ignite the fuel-rich layer so that an air-fuel mixture having a low air-fuel ratio as a whole can be ignited.

As one example of such stratified burning internal combustion engines, a stratified burning internal combustion engine in which stratified vertical tumble flows, that is, vertical vortices (hereinafter simply referred to as "tumble flows") are formed has already been commercialized as illustrated in FIGS. 37 and 38.

FIGS. 37 and 38 show the structure of one of cylinders of a 2-intake-port internal combustion. engine, in which there are illustrated a cylinder block 322, a cylinder 324, a piston 326, a cylinder head 328 and a combustion chamber 330. Designated at numeral 334 is an upper wall of the combustion chamber 330. The upper wall 334 is shaped in the form of a pentroof which has inclined walls 334a,334b. Intake ports 340,342 are open through the inclined wall 334a of the combustion chamber 330 and are each provided with an intake valve 358. Incidentally, numeral 347 indicates an exhaust port arranged in communication with an exhaust passage 360, while numeral 359 designates an exhaust valve.

Intake air, which has flowed into the combustion chamber 330 through the respective intake ports 340,342, then flows along the inclined wall 334b toward an inner wall of the cylinder 324, said inner wall being located on extensions of axes of the individual intake ports 340,342, whereby tumble flows are formed in the combustion chamber 330 as indicated by arrows Fa,Fm.

As is depicted in FIG. 37, only one of the intake ports, namely, the intake port 342 is provided with an injector 312. A spark plug 310 is arranged adjacent to the intake valve 358 in the intake port 342 which is provided with the injector 312. In the vicinity of the spark plug 310, there is accordingly formed the tumble flow Fm of an air-fuel mixture which has been formed of inducted air and fuel injected from the injector 312, so that stratified tumble flows consisting of the tumble flow Fm of the air-fuel mixture and the tumble flow Fa of air are formed in the combustion chamber 330.

Even when the ratio of the air to the fuel inside the combustion chamber 330 is high, in other words, even upon lean burn in which the fuel concentration is low as a whole inside the combustion chamber 330, stable combustion is still feasible owing to the existence of an air-fuel mixture richer in fuel than those present at places remote from the spark plug 310, around the spark plug 310.

Further enhancement of stratification inside the combustion chamber permits lean burn at a still greater air-fuel ratio. Further strengthening of tumble flows makes it possible to achieve a further enhancement of stratification.

SUMMARY OF THE INVENTION

An object of the present invention is to provide a stratified burning internal combustion engine in which stronger tumble flows are formed in a combustion chamber to enhance stratification of an air-fuel mixture in the combustion chamber and hence to permit lean burn at a greater air-fuel ratio. Another object of this invention is to provide a stratified burning internal combustion engine of the type described above, in which a small disturbance is caused to stratified tumble flows immediately before ignition so that the burning velocity after the ignition can be increased to improve the combustion efficiency and also to decrease HC emission.

In one aspect of the present invention, there is thus provided a stratified burning internal combustion engine comprising:

a combustion chamber defined by an inner wall of a cylinder, a top wall of a piston fitted in the cylinder and a lower wall of a cylinder head, a spark plug disposed on the inner wall of the combustion chamber, intake air feed means having plural intake openings each of which is arranged in the lower wall of the cylinder head on one side of an imaginary plane, said imaginary plane containing an axis of the cylinder, and is selectively opened or closed by an associated intake valve, respectively, whereby intake air is allowed to flow in through the intake openings and then to flow further along the lower wall of the cylinder head from said one side of the imaginary plane to the opposite side at a right angle relative to the imaginary plane as viewed in plan so that mutually-parallel plural tumble flows are formed in the same direction within substantially the entirety of the combustion chamber, and fuel feed means for feeding fuel into intake air in said intake air feed means, said intake air being to form one of said plural tumble flows at a location corresponding to the spark plug, whereby stratified tumble flows are caused to exist in the combustion chamber during an intake stroke;

wherein the top wall of the piston has at least one inclined wall extending along the direction of flow of the plural, tumble flows to promote the stratified tumble flows, said inclined wall having a top thereof on said one side of the imaginary plane.

Preferably, the top wall of the piston is provided with a recess located adjacent to the raised portion on the side of the imaginary plane and the recess has a surface smoothly extending in continuation with the inclined wall of the raised portion. The top wall of the piston can have a squishing portion at a location farther from the imaginary plane than an upper end of the inclined wall so that the squishing portion develops squishing in co-operation with a ceiling of the combustion chamber near top dead center during a compression stroke of the piston.

Preferably, a line resulting from intersection between a plane, which extends in parallel with the imaginary plane, and the inclined wall is substantially a straight line. A valve recess can be formed in the raised portion at a part farther from the imaginary plane than an upper end of the inclined wall of the raised portion so that interference between the top wall of the piston and the intake valves, said intake valves being adapted to selectively open or close the associated intake openings, is prevented. Desirably, the part of the raised portion, said part being farther from the imaginary plane than the inclined wall of the raised portion, cooperates with a ceiling of the combustion chamber near top dead center during a compression stroke of the piston so that squishing is caused to occur. The inclined wall can be formed by a surface of a recess which is in turn formed in the top wall of the piston.

In another aspect of the present invention, there is also provided a stratified burning internal combustion engine comprising:

a combustion chamber defined by an inner wall of a cylinder, a top wall of a piston fitted in the cylinder and a lower wall of a cylinder head, a spark plug disposed centrally on the lower wall of the cylinder head, an intake port having two intake openings each of which is arranged in the lower wall of the cylinder head on one side of an imaginary plane, said imaginary plane containing an axis of the cylinder, and is selectively opened or closed by an associated intake valve, whereby intake air is allowed to flow in through the intake openings and then to flow further along the lower wall of the cylinder head from said one side of the imaginary plane to the opposite side at a right angle relative to the imaginary plane as viewed in plan so that mutually-parallel tumble flows are formed in the same direction within substantially the entirety of the combustion chamber, at least one partition disposed extending from an upper inner wall to a lower inner wall of the intake port to divide the intake port into plural sections, whereby the tumble flows are divided into a like plural number of mutually-parallel tumble flows, and fuel feed means for feeding fuel into intake air, said intake air being to form one of said plural number of divided tumble flows at a location corresponding to the spark plug, whereby stratified tumble flows are caused to exist in the combustion chamber during an intake stroke.

The upper wall of the piston can desirably have at least one inclined wall extending along the direction of the stratified tumble flows to promote the stratified tumble flows.

Preferably, the inclined wall is defined by an inclined wall of a raised portion formed on a top wall of the piston with a top of said raised portion being located on at least said one side of the imaginary plane, and the inclined wall of the raised portion is located on a side of the imaginary plane. The raised portion can have the top only on the one side of the imaginary plane. The raised portion can have the top only on the opposite side of the imaginary plane. As a further alternative, the raised portion can have the top on both the one and opposite sides of he imaginary plane. The top wall of the piston can be provided with a recess located adjacent to the raised portion on the side of the imaginary plane and the recess has a surface smoothly extending in continuation with the inclined wall of the raised portion. The top wall of the piston can have a squishing portion at a location farther from the imaginary plane than an upper end of the inclined wall so that the squishing portion develops squishing in cooperation with a ceiling of the combustion chamber near top dead center during a compression stroke of the piston.

A line resulting from intersection between a plane, which extends in parallel with the imaginary plane, and the inclined wall can be substantially a straight line. A valve recess is preferably formed in the raised portion at a part farther from the imaginary plane than an upper end of the inclined wall of the raised portion so that interference between the top wall of the piston and the intake valves, said intake valves being adapted to selectively open or close the associated intake openings, is prevented. Desirably, the part of the raised portion, said part being farther from the imaginary plane than the inclined wall of the raised portion, cooperates with a ceiling of the combustion chamber near top dead center during a compression stroke of the piston so that squishing is caused to occur. The inclined wall can be formed by a surface of a recess which is in turn formed in the top wall of the piston.

In a further aspect of the present invention, there is also provided a stratified burning internal combustion engine comprising:

a combustion chamber defined by an inner wall of a cylinder, a top wall of a piston fitted in the cylinder and a lower wall of a cylinder head, a spark plug disposed in a ceiling of the combustion chamber, plural intake ports having plural intake openings each of which is arranged in the lower wall of the cylinder head on one side of an imaginary plane, said imaginary plane containing an axis of the cylinder, and is selectively opened or closed by an associated intake valve, aid plural intake ports extending in parallel with each other toward said plural intake openings, whereby intake air is allowed to flow in through the intake openings and then to flow further along the lower wall of the cylinder head from said one side of the imaginary plane to the opposite side at a right angle relative to the imaginary plane as viewed in plan so that mutually-parallel tumble flows are formed in the same direction within substantially the entirety of the combustion chamber, and fuel feed means for feeding fuel into intake air, said intake air being to form one of said plural tumble flow at a location corresponding to the spark plug, whereby stratified tumble flows are caused to exist in the combustion chamber during an intake stroke;

wherein the top wall of the piston has at least one inclined wall extending along the direction of the stratified tumble flows to promote the stratified tumble flows.

The inclined wall can be defined by an inclined wall of a raised portion formed on a top wall of the piston with a top of said raised portion being located on at least said one side of the imaginary plane, and the inclined wall of the raised portion is located on a side of the imaginary plane. The top wall of the piston can preferably be provided with a recess located adjacent to the raised portion on the side of the imaginary plane and the recess has a surface smoothly extending in continuation with the inclined wall of the raised portion. The top wall of the piston can have a squishing portion at a location farther from the imaginary plane than a top end of the inclined wall so that the squishing portion develops squishing in cooperation with a ceiling of the combustion chamber near top dead center during a compression stroke of the piston.

Preferably, a line resulting from intersection between a plane, which extends in parallel with the imaginary plane, and the inclined wall is substantially a straight line. A valve recess can be formed in the raised portion at a part farther from the imaginary plane than a top end of the inclined wall of the raised portion so that interference between the top wall of the piston and the intake valves, said intake valves being adapted to selectively open or close the associated intake openings, is prevented. Desirably, the part of the raised portion, said part being farther from the imaginary plane than the inclined wall of the raised portion, cooperates with a ceiling of the combustion chamber near top dead center during a compression stroke of the piston so that squishing is caused to occur. The inclined wall can be formed by a surface of a recess which is in turn formed in the top wall of the piston.

The stratified burning internal combustion engines according to the present invention can form stronger tumble flows in the combustion chamber so that the stratification of an air-fuel mixture in the combustion chamber can be enhanced to permit lean burn at a greater air-fuel ratio. In some of the above-described modifications to the stratified burning internal combustion engines of the present invention, a small disturbance is caused to stratified tumble flows immediately before ignition so that the burning velocity after the ignition can be increased to improve the combustion efficiency and also to decrease HC emission.

BRIEF DESCRIPTION OF THE DRAWINGS

The above and other objects, features and advantages of the present invention will become apparent from the following description and the appended claims, taken in conjunction with the accompanying drawings, in which:

FIGS. 4(a) and 4(b) illustrate in detail the configuration of a top wall of the piston;

FIGS. 8(a) through 8(g) are schematic cross-sectional views of one of the intake ports of the stratified burning internal combustion engine according to the first embodiment of the present invention, and correspond to H—H section to S6—S6 section in FIG. 7, respectively;

DETAILED DESCRIPTION OF THE INVENTION AND PREFERRED EMBODIMENTS

The first embodiment of the present invention is now described with reference to FIG. 1 through FIG. 13.

Figure 1:
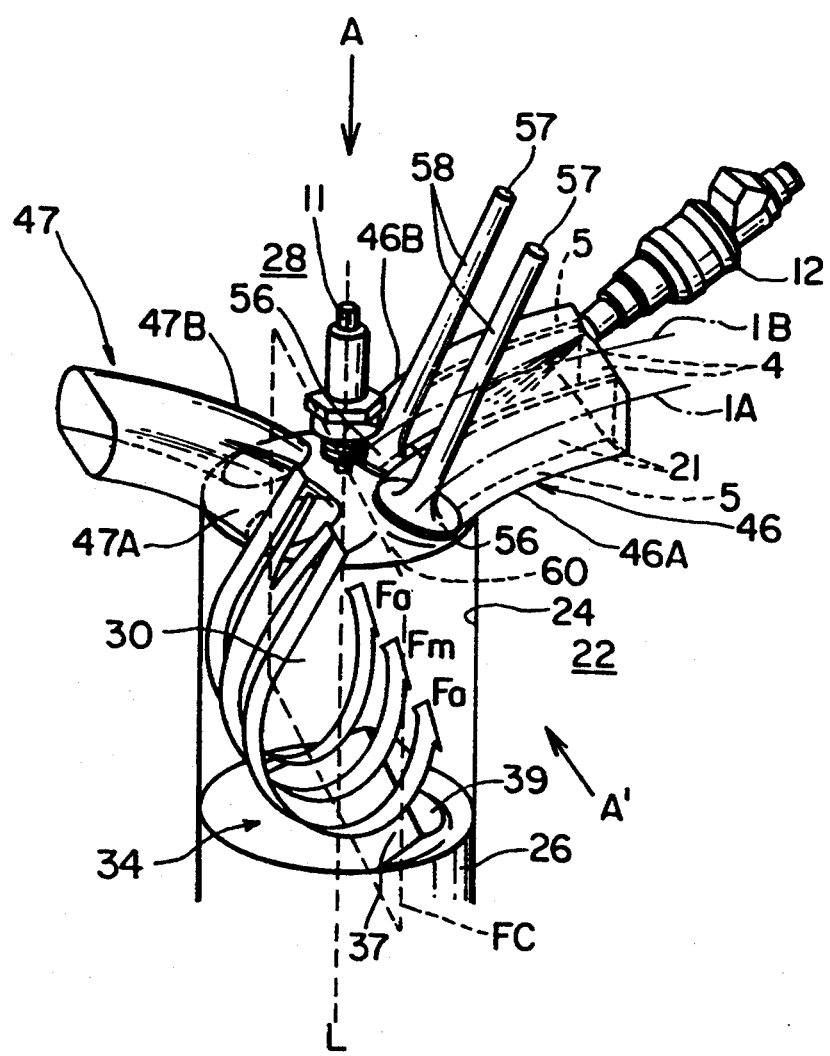
FIG. 1 is a schematic perspective view of a stratified burning internal combustion engine according to a first embodiment of the present invention.

Referring first to FIG. 1, the outline construction of the stratified burning internal combustion engine according to the first embodiment will be described. In each cylinder of the internal combustion engine, a combustion chamber 30 is defined surrounded by an inner wall of a cylinder 24 formed in a cylinder block 22, a piston 26 and a cylinder head 28. An intake port 46 is provided in communication with the combustion chamber 30. Described in detail, this intake port 46 is divided into two sections by a bifurcation 46C so that the intake port 46 is in the form of a Siamese port having two intake ports 46A,46B which penetrate into the combustion chamber 30. At each of intake openings through which the intake ports 46A,46B penetrate into the combustion chamber 30, respectively, an intake valve 58 is disposed to selectively open or close the corresponding intake port. Further, an exhaust port 47 is also provided in communication with the combustion chamber 30. Described specifically, the exhaust port 47 is divided at a longitudinal intermediary point thereof into two sections, whereby the exhaust port 47 is in the form of a Siamese port having two exhaust ports 47A,47B which penetrate into the combustion chamber 30. At an opening of each exhaust port to the combustion chamber 30, an exhaust valve 61 (see FIG. 3) is disposed. Incidentally, the intake ports 46A,46B penetrate into the combustion chamber 30 on one side of an imaginary plane FC which contains an axis L of the cylinder block 22, while the exhaust ports 47A,47B penetrate into the combustion chamber 30 on an opposite side of the imaginary plane FC. A ceiling of the combustion chamber 30, said ceiling being defined by a lower wall 60 of the cylinder head 28, is shaped in the form of a pentroof having two inclined walls 60a,60b (see FIG. 3) arranged in such a way that a top of the ceiling is located on the imaginary plane FC. In addition, a spark plug 11 as an ignition means is disposed substantially centrally in the ceiling of the combustion chamber 30.

Arranged at a point upstream of the bifurcation 46C in the intake port 46 is an injector 12 as a fuel injection means which will be described in detail herein. Through the injector 12, fuel is injected toward a downstream side approximately from the bifurcation 46C in the intake port 46.

Figure 2:
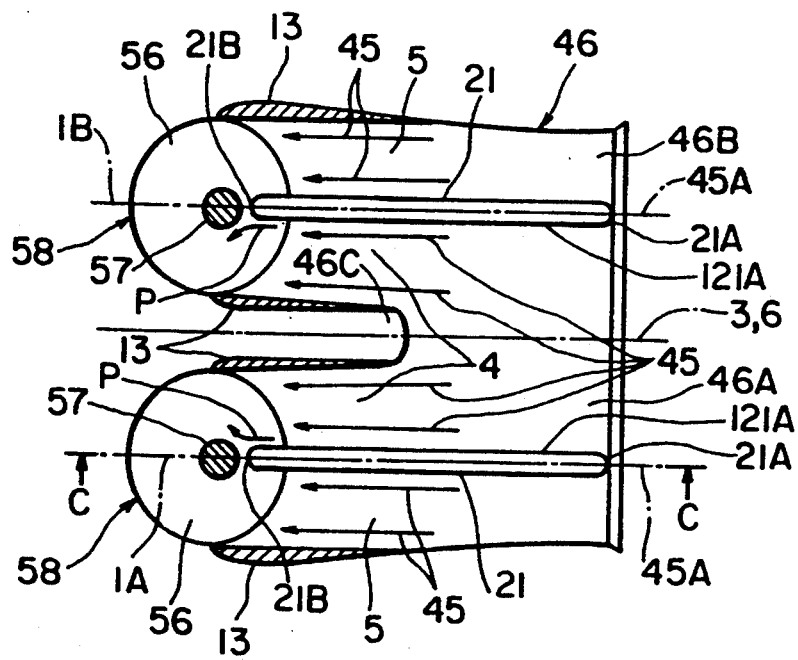
FIG. 2 is a schematic fragmentary top plan view of intake ports of the stratified burning internal combustion engine according to the first embodiment of the present invention as viewed in the direction of arrow A in FIG. 1.

Axes 1A,1B of the respective intake ports 46A,46B extend as mutually-parallel, straight lines as shown in FIGS. 1 and 2. The individual intake ports 46A,46B therefore include directing straight guide portions which extend in parallel with each other. Air flows inducted through the respective intake ports 46A,46B are hence allowed to flow as mutually-parallel flows into the combustion chamber 30. The air, which have been inducted through each intake port 46A or 46B and has flowed into the combustion chamber 30 during an intake stroke, flows toward the opposite side of the imaginary plane FC along the inclined wall 60b of the lower wall 60 of the cylinder head 28 which forms the ceiling of the combustion chamber 30, so that the inducted air flows at a right angle relative to the imaginary plane FC as viewed in plan. The inducted air then descends along the inner wall of the cylinder 24 onto a top wall 35 of the piston 26, and further ascends along the inner wall of the cylinder 24 onto the inclined wall 60a of the lower wall 60 of the cylinder head 28. As a result, vertical vortices (tumble flows) circulating in such planes as extending perpendicularly to the imaginary plane FC are formed within substantially the entirety of the combustion chamber 30 owing to the above-described flow of the inducted air within the combustion chamber 30.

The intake ports 46A,46B are provided with partitions 21,21, respectively. These partitions 21,21 vertically extend along the axes 1A,1B, respectively. Each partition 21 divides the associated intake port 46A or 46B into a central passage 4 and a side passage 5 which lies on an outer side of the central passage 4. The injector 12 is arranged to inject fuel toward the central passage 4 which serves to form a tumble flow at a position corresponding to the spark plug 11.

Owing to the construction described above, a fuel-containing tumble flow Fm and a fuel-free tumble flow Fa are formed in layers in the combustion chamber 30 during an intake stroke. It is important that these tumble flows Fm and Fa are substantially parallel with each other and move in the same direction. As a consequence, the stratified tumble flows Fm,Fa are allowed to exist in the combustion chamber 30 even in a compression stroke.

Characteristic features of the first embodiment will hereinafter be described successively.

Figure 3:
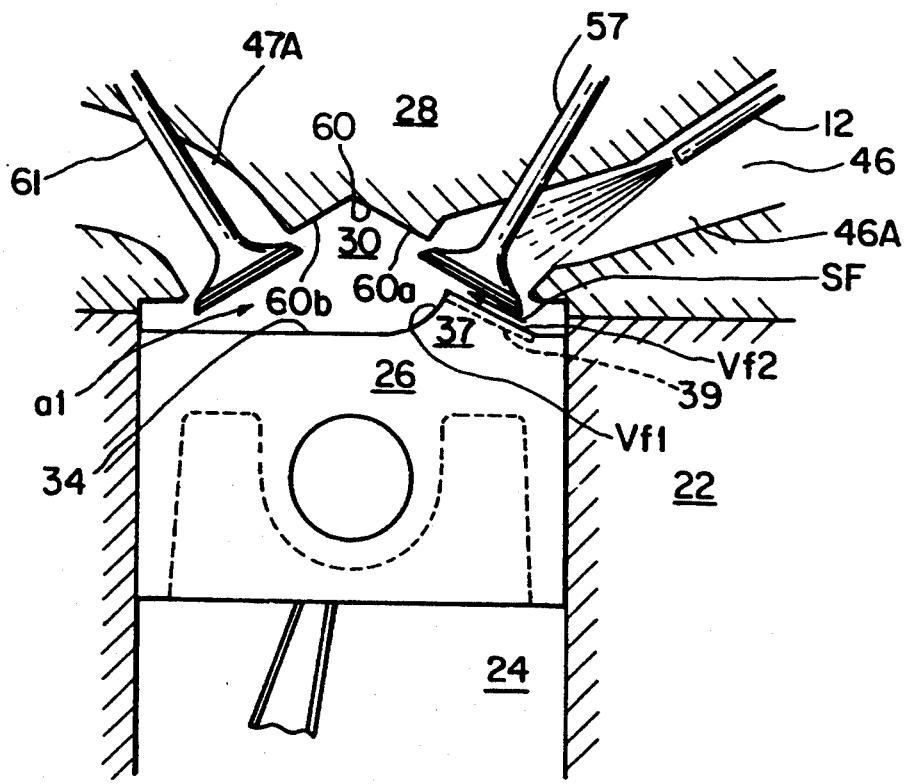
FIG. 3 is a schematic fragmentary side view of a combustion chamber of the stratified burning internal combustion engine according to the first embodiment of the present invention as viewed in the direction of arrow A' in FIG. 1.

A description will first be made of the configuration of the top wall 34 of the piston 26. The piston 26 is provided on the top wall 34 thereof with a raised portion 37 as illustrated in FIGS. 1, 3 and 4. On the top wall 34, a top of the raised portion 37 is located on the side of the intake openings of the intake port 46 relative to the imaginary plane FC. An inclined wall vf1 of the raised portion 37, said inclined wall vf1 being on the side of the imaginary plane FC, is formed so that the inclined wall vf1 extends smoothly in continuation from the top wall 34 of the piston 26. Further, the inclined wall vf1 of the raised portion 37 is also formed so that straight lines are formed parallelly between cross-sections parallel with the imaginary plane FC and a base plane of the top wall 34 of the piston 26. In other words, the inclined wall vf1 of the raised portion 37 is formed such that, when the tumble flows Fm,Fa change their direction to flow along the top wall 34 of the piston 26 and then along the inner wall of the cylinder 24 during an intake stroke, they are kept stratified without mutual mixing.

In addition, an inclined outer wall vf2 of the raised portion 37 is constructed such that, when the piston 26 is located in the vicinity of top dead center during a compression stroke, the inclined outer wall vf2 cooperates with the ceiling of the combustion chamber 30 to develop squishing SF to cause a small disturbance to the tumble flows Fm,Fa.

As is illustrated in FIGS. 1, 3 and 4, the inclined outer wall vf2 of the raised portion 37 is provided with valve recesses 39 to avoid interference with the intake valves 58. This construction allows the piston 26 to take a top dead center position, where a high compression ratio is available, without interference with the intake valves 58 even if opening of the intake valves 58 is overlapped with opening of the exhaust valves 61.

It is to be noted that illustration of the partitions 21 is omitted in FIG. 3 for the convenience of description.

Figure 5:
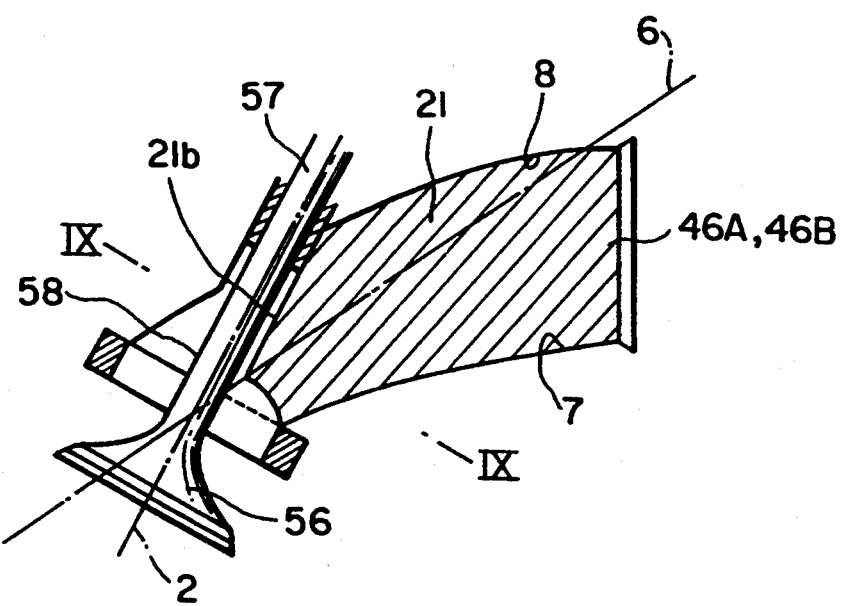
FIG. 5 is a schematic fragmentary cross-sectional view of one of the intake ports of the stratified burning internal combustion engine according to the first embodiment of the present invention, taken in the direction of arrows V—V of FIG. 1.

A description will next be made of the partitions 21 provided inside the intake ports 46A,46B described above. Each partition 21 is arranged, as illustrated in FIG. 5, with a downstream-side end portion 21B thereof extending close to the corresponding intake valve 58 in the intake port 46A or 46B. Described specifically, the downstream-side end portion 21B of each partition 21 is formed with a suitable clearance maintained between the downstream-side end portion 21B and a valve head 56 of the corresponding intake valve 58 and a valve stem 57 extending across the intake port 46A or 46B so that neither the valve head 56 nor the valve stem 57 is brought into contact with the downstream-side end portion 21B. Owing to this construction, operation of each intake valve 58 is not affected at all by its corresponding partition 21. Each partition 21 is formed along a central streamline 45A of individual streamlines 45 in the corresponding intake port 46A or 46B and also along the axis 1A or 1B of the corresponding intake port 46A or 46B. As a consequence, air flows inducted through the intake port 46 are allowed to enter in a more straightened state into the combustion chamber 30. Since the intake ports 46A,46B are substantially parallel with each other, these partitions 21,21 are also arranged substantially parallel with each other.

Figure 6:
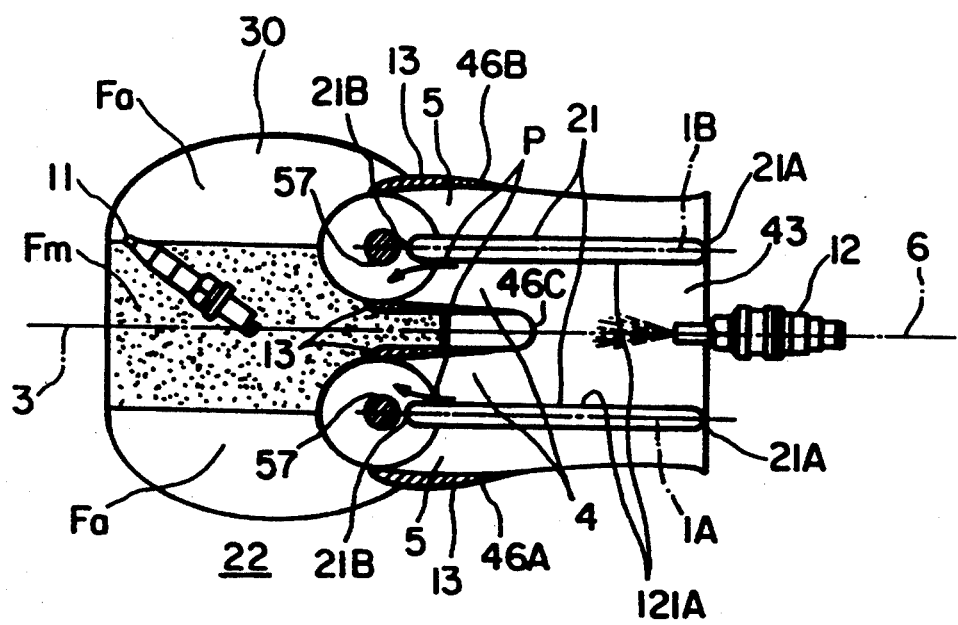
FIG. 6 is a schematic top plan view of the combustion chamber of the stratified burning internal combustion engine according to the first embodiment of the present invention as viewed in the direction of arrow A in FIG. 1.

As is depicted in FIGS. 2 and 6, an upstream-side end portion 21A and the downstream-side end portion 21B of each partition 21 are each shaped to define an outwardly-convex, curved surface so that straightening of inducted air can be improved. The formation of the upstream-side end portion 21A and the downstream-side end portion 21B as described above is not only to achieve a reduction in flow resistance by the straightening of inducted air but also to provide an advantage in the production of the partitions 21. Namely, the formation of the end portions 21A,21B of each partition 21 into such an outwardly-convex, curved surface can facilitate removal of molds (cores), which correspond to the end portions 21, upon production of the intake port 46 by casting or the like, so that the casting or the like can be conducted easily without failure.

The arrangement of the injector 12 and a relationship between the injector 12 and the partitions 21 will be described next with reference to FIGS. 1, 3, 5 and 6.

The interior of each of the intake ports 46A,46B is divided into the central passage 4 and the side passage 5 by the corresponding partition 21 as illustrated in FIG. 6. The injector 12 as the fuel injection means is disposed, as shown in FIGS. 1, 3 and 6, on the side upstream of the bifurcation 46C of the two intake ports 46A,46B. This injector 12 is also designed to inject fuel toward the downstream sides of the two intake ports 46A,46B in unison with each intake stroke. Incidentally, numeral 6 in FIGS. 5 and 6 is an axis of the injector 12 and also indicates a central line of an injection range.

Namely, as indicated by the injection axis 6 in FIGS. 5 and 6, the fuel injected from the side of an upper wall of the intake port is inducted into the combustion chamber 30 through the central passage 4 and, through the side passage 5, only air is inducted into the combustion chamber 30.

The flows divided into the central passage 4 and the side passage 5 in each of the intake port 46A,46B are therefore allowed to enter in layers into the combustion chamber 30 while being kept separated from each other and straightened by the corresponding partition 21. Owing to the provision of the partitions 21 arranged as described above, the inducted air flows, after penetration into the combustion chamber 30, are brought into such a state as separated into three layers consisting of a layer Fm of an air-fuel mixture and layers Fa,Fa of air alone (i.e., three flows in total, one passing through the central passage 4 and the other two through the side passages 5 arranged on opposite sides of the central passage 4), in other words, stratified tumble flows as shown in FIG. 6.

The diameter of each valve stem 57 and the thickness of each partition 21 will next be described with reference to FIGS. 2 and 6.

As is depicted in FIGS. 2 and 6, the central line of the partition 21 and the central axis of the corresponding valve stem 57 lie in the same plane and the thickness of the partition 21 is formed smaller than the diameter of the valve stem 57. In other words, a surface 121A of the partition 21, said surface 121A being on the side of the central passage 4, is set back toward the corresponding side passage 5 from a surface of the valve stem 57, said surface being on the side of the central passage 4.

As is shown in FIG. 6, a spray of fuel in the flow of the air-fuel mixture along the inner surface 121A of each partition 21 is therefore caused to advance while being guided by the inner surface of the corresponding valve stem 57 and are then directed along arrows P toward the spark plug 11 provided centrally on the ceiling of the combustion chamber, so that the spray of fuel is caused to center around the spark plug 11.

The configurations of cross-sections of the intake port 46 taken in directions transverse to the intake air flows will next be described with reference to FIGS. 7 and 8.

As is shown in FIGS. 8(a) through 8(g), the intake port 46 is formed in such a way that upper half portions 46A-1,46B-1 gradually become wider relative to lower half portions 46A-2,46B-2 toward the downstream side.

This makes it easier for intake air flows, which have been inducted through the intake ports 46A,46B, to form tumble flows within the combustion chamber 30. In the S4—S4 section shown in FIG. 8(e), the intake port 46 is bifurcated into a Siamese port so that the intake ports 46A,46B are formed. Further, each port presents an inverted triangular configuration. The inverted, substantially triangular cross-sectional configuration of the intake ports 46A,46B becomes more distinct toward the downstream side in order to further enhance the tumble flows.

By making the upper half portion 46-1 wider than the lower half portion 46-2 in each section of the intake port 46, the flow velocity and flow rate through the upper half portion 46-1 in the intake port 46 are greater than those through the lower half portion 46-2. When the intake valves 58 have been opened, on the other hand, there are, as depicted in FIG. 7, a flow component a promoting the tumble flows Fa,Fm and another flow component b suppressing the tumble flows Fa,Fm. The tumble flows Fa,Fm can therefore be made still stronger by making the flow velocity and flow rate through the upper half portion of the intake port 46 greater than those through the lower half portion of the intake port 46. Since the flow component a is in the same direction as the tumble flows Fa,Fm, the flow resistance of the flow component a is extremely small and the overall flow rate can therefore be increased significantly.

As is illustrated in FIGS. 8(a) through 8(g), the partitions 21,21 are provided in the intake port 46 along substantially the entire length thereof. The partitions 21,21 are provided extending from a lower wall 7 of the intake port 46 to a top wall 8 of the intake port 46 so that the interiors of the intake ports 46A,46B are divided transversely into two halves. As a consequence, the intake air flows inducted through the intake ports 46A,46B are each branched into the central passage 4 and the side passage 5.

In other words, as is depicted in FIG. 8(a), the two intake ports 46A,46B are formed as a single intake passage on a most upstream side, that is, in the vicinity of a side wall 28A (see FIG. 7) of the cylinder head 28. Immediately after that, the flow of inducted air is branched toward the central passage 4 and the side passages 5 by the partitions 21. As is illustrated in FIGS. 8(b) through 8(d), the central passage 4 is then gradually divided into two halves and on the side downstream of the section S4—S4 shown in FIG. 8(e), the inducted air flow is completely halved. The intake air flows divided into the two halves as described above are then allowed to enter the combustion chamber 30 by the respective intake valves 58.

The intake port 46 will be described in further detail with reference to FIGS. 7, 8 and 9.

Figure 7:
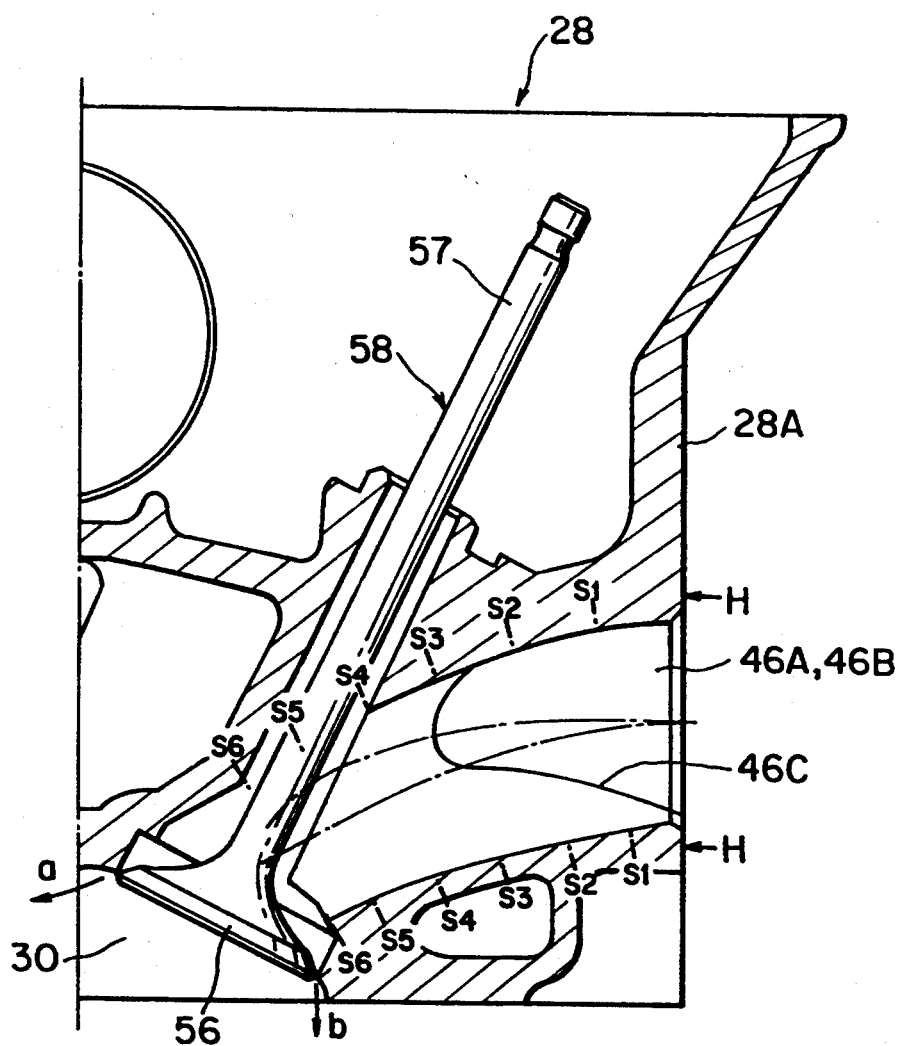
FIG. 7 is a schematic fragmentary cross-sectional view of one of the intake ports of the stratified burning internal combustion engine according to the first embodiment of the present invention as viewed in the direction of arrow A' in FIG. 1.

The intake port 46 has a substantially straight configuration as shown in FIG. 7 so that intake air flows are directed to form tumble flows within the combustion chamber 30. Because of the structure of the cylinder head, on the other hand, it is impossible to make an axis of the intake opening, which is selectively opened or closed by each intake valve 58, conform with the direction of an inducted air flow. Downstream end portions of the respective intake ports 46A,46B are therefore connected to their corresponding intake openings via bent portions having a large curvature. The actual cross-sectional flow area therefore becomes smallest at each bent portion as is clearly envisaged from FIGS. 8(f) and 8(g). Coupled especially with the existence of the valve stem 57, a stem guide (not shown) and the partition 21, the actual cross-sectional flow area is reduced substantially there.

To cope with this, the intake ports 46A,46B are each provided with inflated parts 13,13 dimensioned such that the inner width of the intake port becomes greatest at the bent portion and is set greater there than the intake opening selectively opened or closed by the corresponding intake valve 58. This can prevent the actual cross-sectional flow area from being reduced at each bent portion and can assure a sufficient flow velocity and flow rate.

Figure 9:
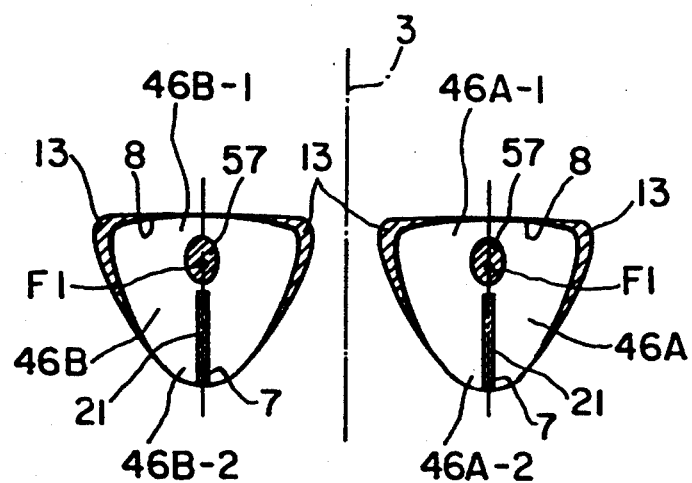
FIG. 9 is a schematic cross-sectional view of one of the intake ports of the stratified burning internal combustion engine according to the first embodiment of the present invention, taken in the direction of arrows IX—IX of FIG. 5.

Since the inflated parts are formed primarily in the upper half portions 46A-1,46B-1 of the respective ports 46A,46B as is evident from FIG. 9, the flow velocity and flow rate through the upper half portions 46A-1,46B-1 can be made still greater than those through the lower half portions 46A-2,46B-2 so that the formation of the tumble flows Fa,Fm can be achieved more effectively.

As the stratified burning internal combustion engine as the first embodiment of the present invention is constructed as described above, the intake air flowed into the combustion chamber. 30 through the respective intake ports 46A,46B during an intake stroke forms the tumble flow Fm of the air-fuel mixture and the tumble flows Fa of air as layers. The stratified tumble flows Fm, Fa still remain even after the piston operation next enters a compression stroke. When the piston however approaches close to top dead center during the compression stroke, the individual tumble flows Fm,Fa are begun to be deformed. A rich air-fuel mixture however still exists around the spark plug 11 within the combustion chamber 30. In this state, ignition is conducted by the spark plug 11. Subsequent combustion and expansion stroke and exhaust stroke are exactly the same as those in a conventional stratified burning internal combustion engine.

Even when the air-fuel mixture is leaner than the stoichiometric air-fuel ratio as a whole inside the combustion chamber 30, the features described above make it possible to operate the engine without impairment to the ignition because of the existence of an air-fuel mixture containing the fuel at a concentration sufficient for ignition in the vicinity of the spark plug 11.

In the above-described first embodiment, in particular, the top wall 34 of the piston 26 is provided with the inclined wall vf1 of the raised portion 37, whereby the tumble flows Fm,Fa are formed with greater strength and hence in a more complete stratified form. As a consequence, fully-stabilized ignition and combustion can be achieved even when the air-fuel ratio of the air-fuel mixture in the entirety of the combustion chamber 30 is lowered further.

By the squishing SF which the inclined outer wall vf2 of the raised portion 37 of the piston 26 develops in cooperation with the ceiling of the combustion chamber in the vicinity of top dead center of a compression stroke, a small disturbance is caused to occur in the air-fuel mixture. The burning velocity after the ignition can be improved accordingly. Since this squishing SF gives adverse effects if it is too strong, it is important to suitably adjust the clearance between the inclined outer wall vf2 and the ceiling of the combustion chamber 30 when the piston assumes the top dead center. Further, the inclined outer wall vf2 of the raised portion 37 is provided with the valve recesses 39, whereby even when opening of the intake valves 58 is overlapped with that of the exhaust valves 61 when the piston 26 has reached the top dead center, the inclined outer wall vf2 is prevented from interfering with the intake valves 58. This makes it possible to set the top dead center of the piston 26 at a higher point to provide a higher compression ratio, whereby the combustion efficiency can be improved.

Figure 10:
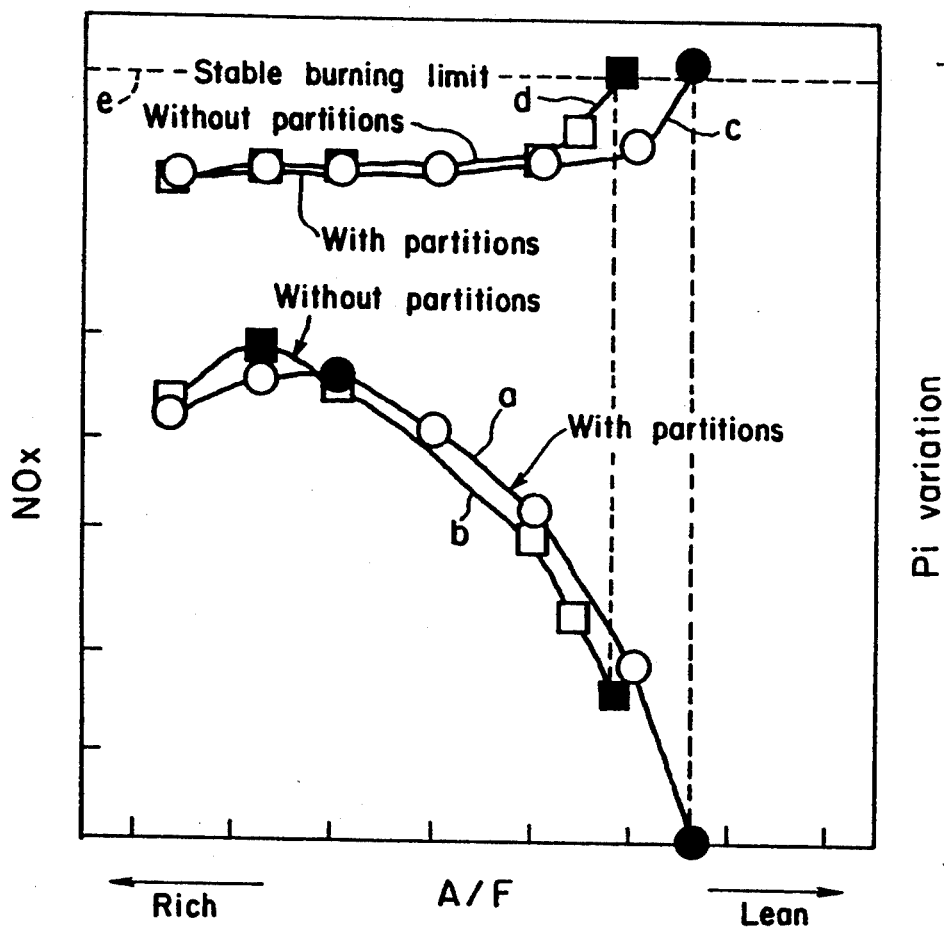
FIG. 10 diagrammatically shows effects of the structure of the intake ports of the stratified burning internal combustion engine according to the first embodiment of the present invention.

As is shown diagrammatically in FIG. 10, it is possible to operate an engine with a leaner air-fuel mixture by providing the intake ports 46A,46B with the partitions 21, respectively, and hence promoting the stratification of the air-fuel mixture. In the diagram, air-fuel ratios (A/F) are plotted along the axis of abscissas while both amounts of NOx emitted and variations of Pi (indicated mean effective pressure variations) are plotted along axis of ordinates. Curves a,c indicate characteristics of an engine whose intake ports are each provided with a partition 21, whereas curves b,d represent characteristics of an engine which has conventional tumble flow intake ports not provided with the partition 21. The curves a,b relate to NOx emission and the curves c,d pertain to Pi variation.

As is clearly envisaged from FIG. 10, the emission of NOx reaches a peak on a leaner side of A/F in the case of the engine provided with the partitions 21 (see the curve a) than in the case of the engine making use of conventional tumble flows (see the curve b). Further, the former engine can reduce the peak value itself of the NOx emission. Namely, the stratification of tumble flows inside the combustion chamber 30 is promoted so that the A/F value corresponding to a peak value of NOx emission is shifted toward the leaner side than the conventional engine.

On the other hand, the curves c and d each indicates a relationship between A/F and Pi variation. Here, Pi variation provides an indication which makes it possible to judge the combustion stability of an engine. If the Pi variation is too high, the combustion in an engine is not stabilized, resulting in an unpleasant operation accompanied by variations in torque. Incidentally, a reference line e in the diagram indicates a Pi variation of a stable burning limit for generally permitting an operation without discomfort.

As is shown in the diagram, the engine provided with the partitions 21 (see the curve c) can be operated at a leaner A/F ratio than the engine making use of conventional tumble flows (see the curve d) at the limit value of Pi variation for the attainment of stable combustion in each cylinder, and can also reduce NOx emission substantially at the limit value of Pi variation. Namely, the diagram indicates that the engine provided with the partitions 21 can obtain stable combustion even at a leaner A/F ratio and can also improve the A/F ratio at the stable burning limit.

The construction of the first embodiment can therefore realize an engine which features extremely low fuel consumption and emits substantially no NOx.

Since the thickness of each partition 21 is smaller than the diameter of the corresponding valve stem 57 and the central axis of the partition 21 and that of the valve stem 57 lie in the same plane, the surface of the partition 21, said surface being on the side of the associated central passage, is set back toward the associated side passage 5 from the surface of the valve stem 57, said surface being on the side of the central passage. A spray of fuel in the flow of the air-fuel mixture within the central passage 4, said flow moving along the partition 21, is directed toward the spark plug 11 while being guided by the inner surface of the valve stem 57. The spray of fuel in the air-fuel mixture is therefore caused to center around the spark plug 11, whereby their ignition can be achieved well and the lean limit can be extended further.

In particular, the upper half portions 46A-1,46B-1 in the inverted, substantially triangular sections of the intake ports 46A,46B in the construction of the first embodiment are formed significantly large as shown in FIGS. 7 and 9. This makes it possible to maintain strong tumble flows inside the combustion chamber 30 and to secure a sufficient flow-rate coefficient upon full throttle.

In the first embodiment, the inflated parts 13 are formed at the bent portion of each of the intake ports 46A,46B, at which bent portion the actual cross-sectional flow area becomes the smallest, and on the side downstream of each valve stem 57, the partition 21 which causes flow resistance is not provided. It is therefore possible to more effectively maintain the above-mentioned strong tumble flows inside the combustion engine 30 and the above-mentioned flow-rate coefficient upon full throttle.

Further, the construction that the partition 21 is not provided on the side downstream of the valve stem 57 in each of the intake ports 46A,46B has large merits in production as will be described hereinafter. If the partition 21 is also provided on the side downstream of each valve stem 57, it is necessary to drill the partition 21 at a part corresponding to the valve stem 57 after casting the partition 21. The partition 21 is however thin, so that there is the potential problem that cracks may occur upon drilling. In addition, the partition 21 also exists in a cantilevered fashion on the side downstream of the valve stem 57 in each of the intake ports 46A,46B, leading to the inconvenience that the construction becomes no longer preferred from the standpoint of strength. In the first embodiment, however, the partition 21 is not present on the side downstream of each valve stem 57 as described above, thereby making it possible to completely avoid such inconvenience. Moreover, it has been confirmed that stratification is practically unaffected even when the partition 21 is not provided on the side downstream of each valve stem 57. The omission of the partition 21 on the side downstream of each valve stem 57 can therefore provide such great merits in production.

Figure 11:
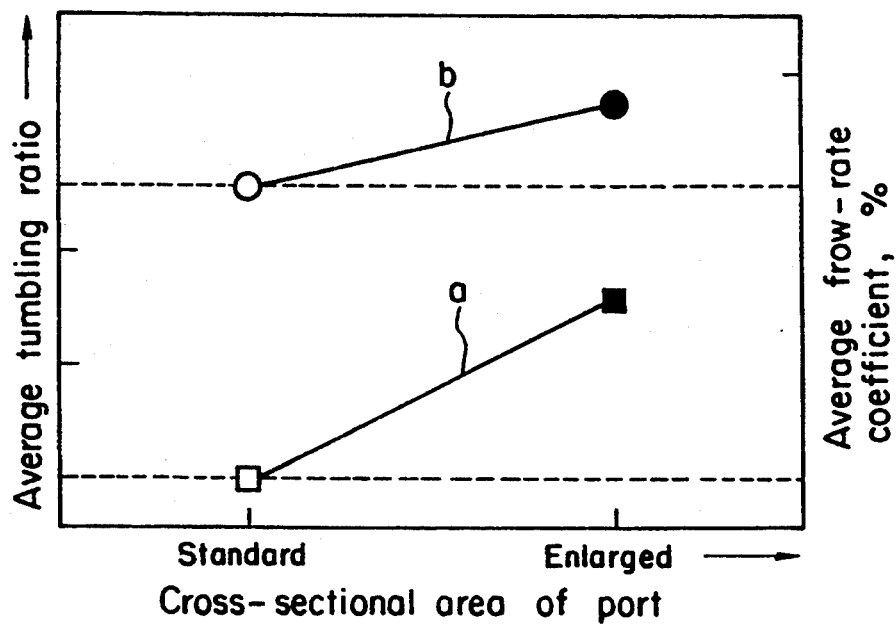
FIG. 11 also diagrammatically illustrates effects of the structure of the stratified burning internal combustion engine according to the first embodiment of the present invention.

FIG. 11 illustrates port cross-sectional areas and average tumbling ratios (tumble flow velocities/engine speeds) as a function of average flow-rate coefficient (i.e., flow rate as a whole). In the diagram, line a shows a relationship between port cross-sectional areas and average tumbling ratios while line b indicates a relationship between port cross-sectional areas and average flow-rate coefficients. The solid square (■) indicates the average flow-rate coefficient of an engine equipped with an intake port in which the upper half portions 46A-1,46B-1 in cross-sections of intake ports 46A,46B are enlarged sufficiently.

On the other hand, the circle (O) indicates the average tumbling ratio of an engine equipped with a conventional tumble flow intake port. In the case of an engine corresponding to the dot (●), the Upper half portions 46A-1,46B-1 of intake ports 46A,46B have sufficiently large dimensions to provide significant port cross-sectional areas so that both the average tumbling ratio and the average flow-rate coefficient can be improved as shown in the diagram.

Figure 12:
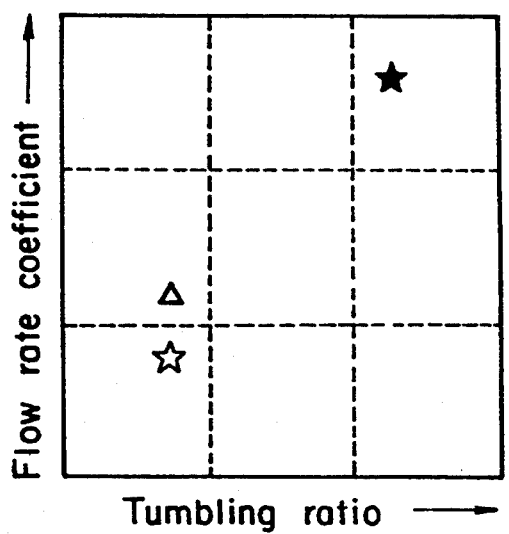
FIG. 12 also diagrammatically depicts effects of the structure of the stratified burning internal combustion engine according to the first embodiment of the present invention.

A relationship between tumbling ratios and flow-rate coefficients can therefore be illustrated as shown in FIG. 12, in which the triangle (Δ) corresponds to an engine making use of conventional tumble flows, the star ☆ to an engine in which partitions 21 are provided but the cross-sectional areas of intake ports 46A,46B are reduced because of the provision of the partitions 21, and the solid star ★ to an engine having the construction according to the first embodiment of the present invention and equipped with intake ports 46A,46B whose upper half portions 46A-1,46B-1 have been enlarged sufficiently. As is indicated by FIG. 12, the mere attachment of the partition 21 to each of the intake ports 46A,46B results in a reduction in flow-rate coefficient although the stratification of inducted air flows may be promoted, leading to the inconvenience that the performance upon full throttle is lowered. As indicated by the solid star ★, both the tumbling ratio and the flow-rate coefficient can be improved by sufficiently enlarging the upper half portions 46A-1,46B-1 of the sections of the intake ports 46A,46B. In the manner described above, it is possible to compensate for the reduction in cross-sectional area of each of the intake ports 46A,46B, said reduction being caused by the provision of the partition 21, thereby making it possible to maintain strong tumble flows inside the combustion chamber 30 and also to secure the full-throttle performance of an engine.

Figure 13:
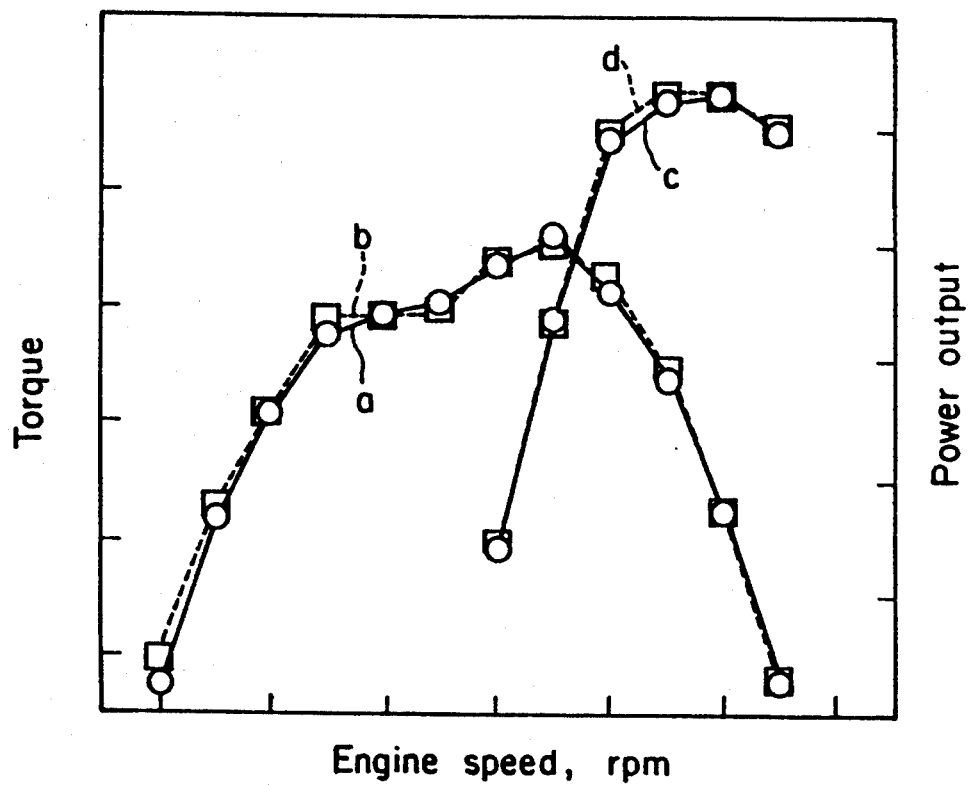
FIG. 13 also diagrammatically shows effects of the structure of the stratified burning internal combustion engine according to the first embodiment of the present invention.

FIG. 13 illustrates the rotary torque and power output of an engine, in which curves a,c diagrammatically show characteristics of an engine having the construction according to the first embodiment of the present invention and curves b,d diagrammatically depict characteristics of an engine having a conventional intake port construction. First, each of the curves a,b indicates a relationship between rotary speeds and torques of the engine. There is no substantial difference between the two curves, thereby indicating that the engine having the construction according to the first embodiment of this invention can achieve a torque comparative to that available from the conventional engine even when the former engine is operated on an air-fuel mixture leaner than a conventional air-fuel ratio.

Curves c and d each illustrates an engine speed-power output relationship of an engine. Like the torque characteristics described above, there is no substantial difference between the curve c and curve d, thereby indicating that a power output similar to that available with the conventional engine can be obtained even when operated using an air-fuel mixture leaner than that for the conventional engine.

As is shown in FIG. 13, the engine having the construction according to the first embodiment of the present invention provides the intake ports 46A,46B with an increased tumbling ratio and flow-rate coefficient and, as a result, an internal combustion engine having equivalent torque and output characteristics to conventional engines can be achieved.

By providing the intake port 46 with the partitions 21 and making sufficiently large the upper half portions 46A-1,46B-1 of substantially triangular sections of the intake ports 46A,46B, stable combustion can be maintained and NOx can be reduced with an air-fuel mixture leaner than that used for conventional internal combustion engines without lowering both the torque and the power output from those available from the conventional internal combustion engines. At the same time, the fuel consumption can also be improved.

Modifications of the configuration of the top wall of the piston will next be described using FIGS. 14 and 15.

Figures 4A, 4B:
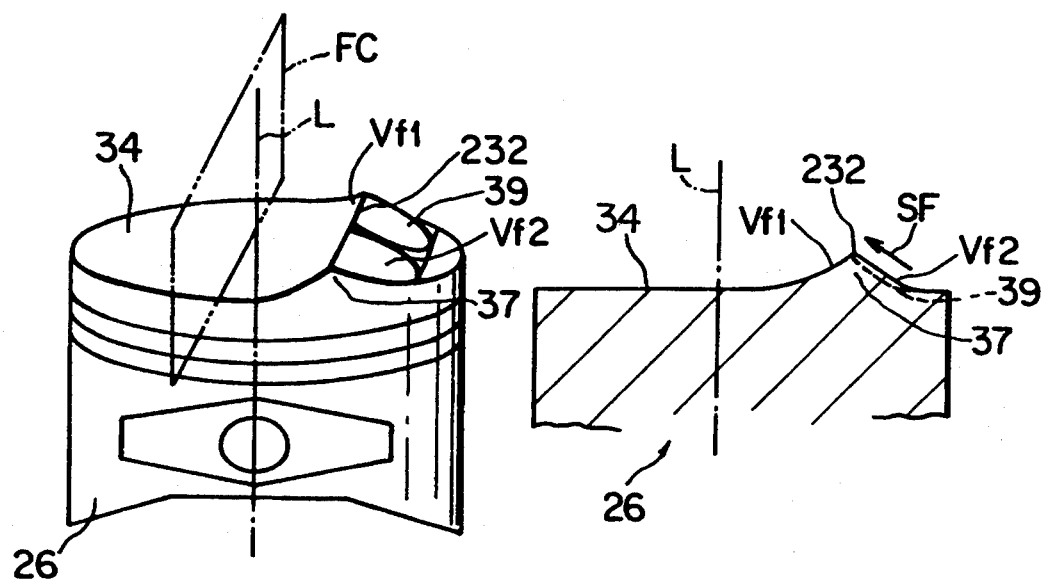
FIG. 4(a) is a schematic fragmentary perspective view of a piston of the stratified burning internal combustion engine according to the first embodiment of the present invention and FIG. 4(b) is a fragmentary cross-sectional view of the piston.

The engine according to the first embodiment as shown in FIGS. 1 and 3 is provided with the piston 26 having the top wall 34 with the raised portion 37 as illustrated in FIGS. 4(a) and 4(b). Instead of the piston 26, a piston 26a as depicted in FIGS. 14(a) and 14(b) is adopted.

Figure 14A:
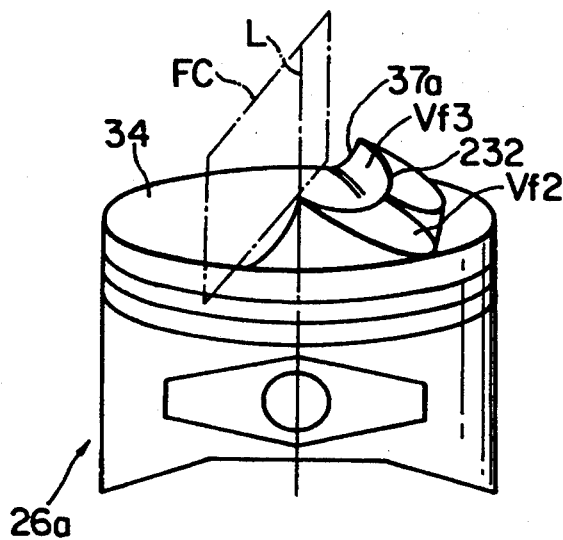
FIGS. 14(a) and 14(b) are similar to FIGS. 4(a) and 4(b), respectively, and illustrate in detail the configuration of a top wall of a modification of the piston.
Figure 14B:
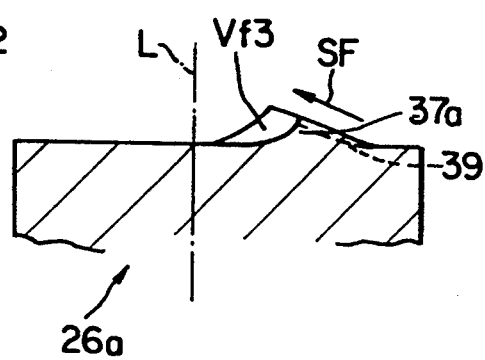

In FIGS. 14(a) and 14(b), a top wall of the piston 26a is provided with a raised portion 37a. On the top wall 34, a ridgeline 232 of the raised portion 37a is located on the side of the intake openings of the intake port 46 relative to the imaginary plane FC. An inclined wall vf3 of the raised portion 37a, said inclined wall vf3 being located on the side of the imaginary plane FC, is formed such that the top wall 34 of the piston 26a extends as a smooth continuous wall. The inclined wall vf3 has a concave configuration symmetrical with respect to a plane extending at a right angle relative to the imaginary plane FC and containing the axis of the cylinder, namely, a widthwise central plane of the tumble flow Fm (see FIG. 1).

In the modification of FIGS. 14(a) and 14(b), the inclined wall vf3 is recessed as described above. Accordingly the tumble flows Fa,Fm all tend to move toward a center of the tumble flow Fm when they change their directions so that they flow along the top wall of the piston 26a and then along the inner wall of the cylinder. Since the inclined wall vf3 is symmetrical with respect to the widthwise central plane of the tumble flow Fm, the stratified state of the tumble flows Fa,Fm is not deformed.

Figure 15A:
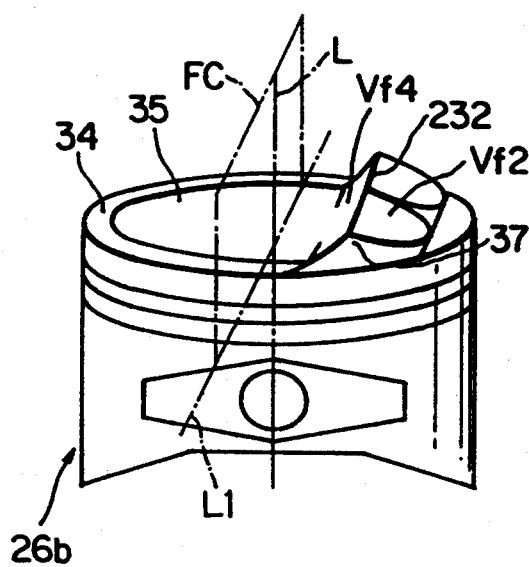
FIGS. 15(a) and 15(b) are similar to FIGS. 4(a) and 4(b), respectively, and depict in detail the configuration of a top wall of a further modification of the piston.
Figure 15B:
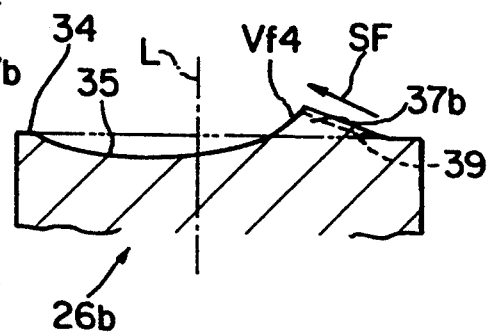

The next modification employs a piston 26b as illustrated in FIGS. 15(a) and 15(b).

A top wall 34 of the piston 26b in FIGS. 15(a) and 15(b) is provided with a recess 35 and a raised portion 37b. On the top wall 34, a ridgeline 232 of the raised portion 37b is located on the side of the intake openings of the intake port 46 relative to the imaginary plane FC. On the other hand, the recess 35 is located in the top wall 34 adjacent to the raised portion 37b on the side of the imaginary plane FC. The recess 35 has a surface smoothly extending in continuation with an inclined wall vf4 of the raised portion 37b, said inclined wall vf4 being located on the side of the imaginary plane FC. The inclined wall vf4 and said surface of the recess 35 are formed of a set of straight lines parallel to an imaginary line L1 which crosses at a right angle with the axis L of the cylinder in the imaginary plane FC.

In the modification illustrated in FIGS. 15(a), and 15(b), the recess 35 is provided in combination with the raised portion 37b. The stratified state of the tumble flows Fa,Fm is therefore maintained more intact when the tumble flows Fa,Fm change their directions so that they flow along the top wall 34 of the piston 26b and then along the inner wall of the cylinder.

In the first embodiment and its modifications described above, the raised portions 37,37a,37b, the ridgeline 232 is positioned on the side of the intake opening for the intake port 46. The ridgeline may however be positioned on the side of the exhaust opening for the exhaust port 47 so that the formation of the tumble flows Fa,Fm,Fa can be promoted by an inclined wall extending from the ridgeline toward the imaginary plane FC. As a still further alternative, two ridgelines can be provided, one on the side of the intake opening for the intake port 46 and the other on the side of the exhaust opening for the exhaust port 47. The formation of the tumble flows Fa,Fm,Fa can then be promoted by two inclined walls which extend from the respective ridgelines toward the imaginary plane FC.

Figure 16:
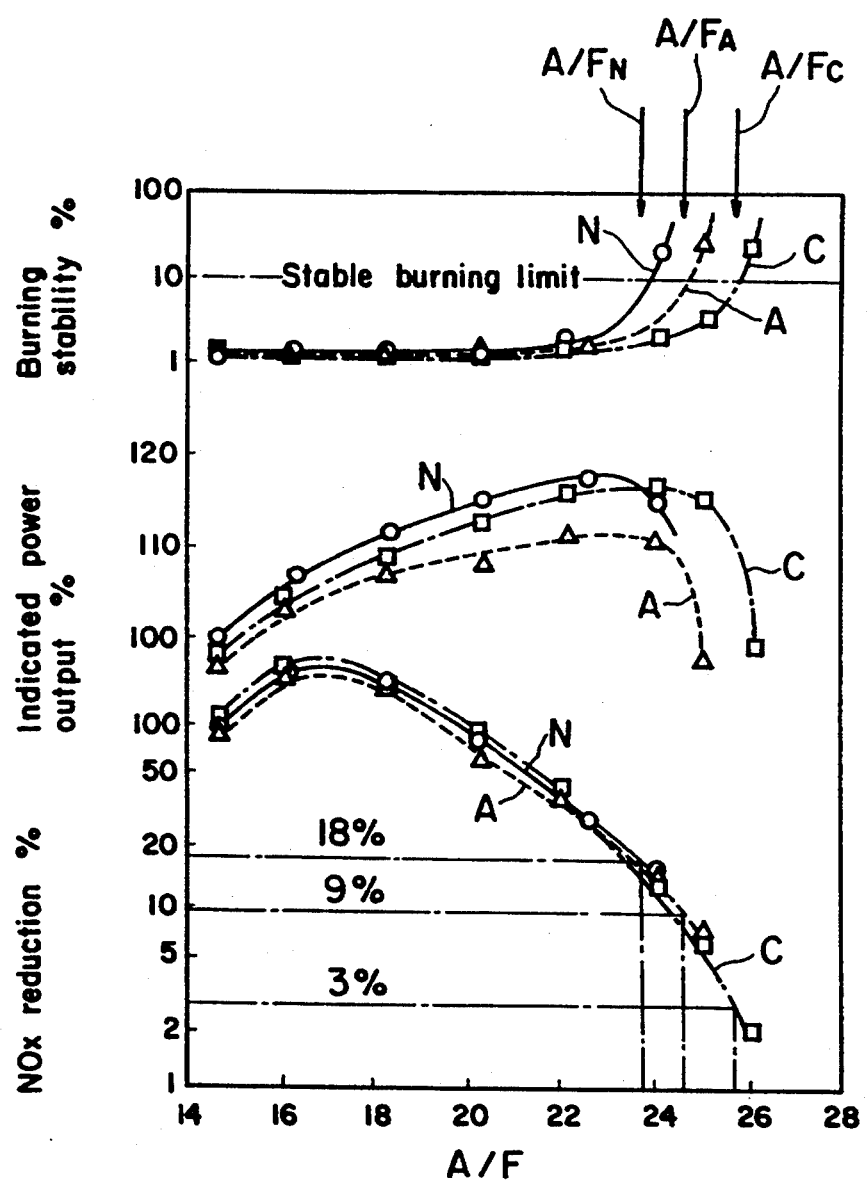
FIG. 16 diagrammatically shows effects of the configuration of the top wall of the piston of the stratified burning internal combustion engine according to the first embodiment of the present invention.

In FIG. 16, characteristics of a conventional engine with pistons having a flat top wall are indicated by curves N, those of an engine E with pistons having a top wall provided with the inclined wall vf1 shown in FIG. 1 by curves A, and those of an engine with pistons having a top wall provided with the recess 35 and the inclined wall vf4 depicted in FIGS. 15(a) and 15(b) by curves C. In the diagram, combustion stability, indicated power output and NOx reduction rate are indicated separately. During the tests, the air-fuel ratio was changed by changing the amount of air while maintaining the amount of fuel constant. A difference in indicated power output in this case shows a difference in gas mileage.

Compared with the standard type, the air-fuel ratio at the lean limit was improved by 1 in the case of the engine E indicated by the curve A and by 2 in the case of the engine indicated by the curve C. As a result, NOx emission at the lean limit was reduced to 50% in the case of the engine E indicated by the curve A and to 16% in the case of the engine indicated by the curve C.

Figure 17:
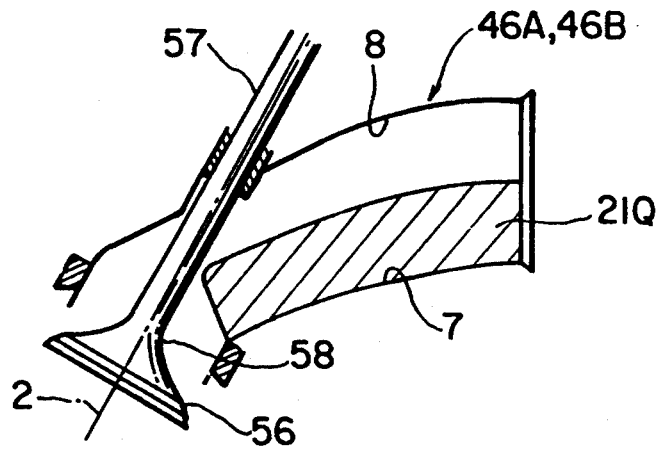
FIG. 17 is similar to FIG. 5 and illustrates the structure of a modification of each intake port of the stratified burning internal combustion engine according to the first embodiment of the present invention.

A modification of the partitions 21 inside the intake ports 46A,46B will next be described with reference to FIG. 17. According to this modification, a partition 21Q is disposed instead of the partition 21 only in a substantially lower half portion of each of the intake ports 46A,46B. The injector 12 is however arranged on the inside upstream of the bifurcation 46C within the intake port 46 while being directed downwardly from the upper wall of the intake port. Since fuel tends to concentrate on the side of the lower wall of the intake port, stratification of the tumble flows Fa,Fm by the central passages 4 and the side passages 5 is sufficiently feasible even when partitions are arranged on the side of a relatively lower wall of the intake port like the partition 21Q.

Using FIGS. 18 to 25, a description will next be made of modifications of the relationship between the arrangement and direction of the injector 12 and the partitions 21.

Figure 18:
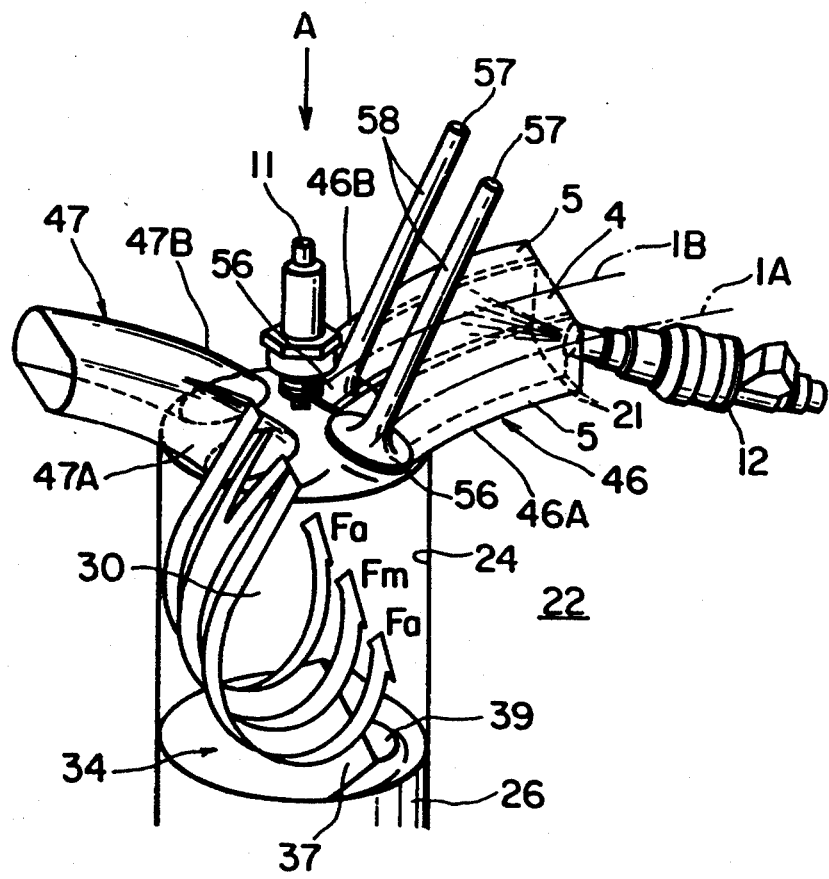
FIG. 18 is similar to FIG. 1 and illustrates a modification of the stratified burning internal combustion engine according to the first embodiment of the present invention.
Figure 19:
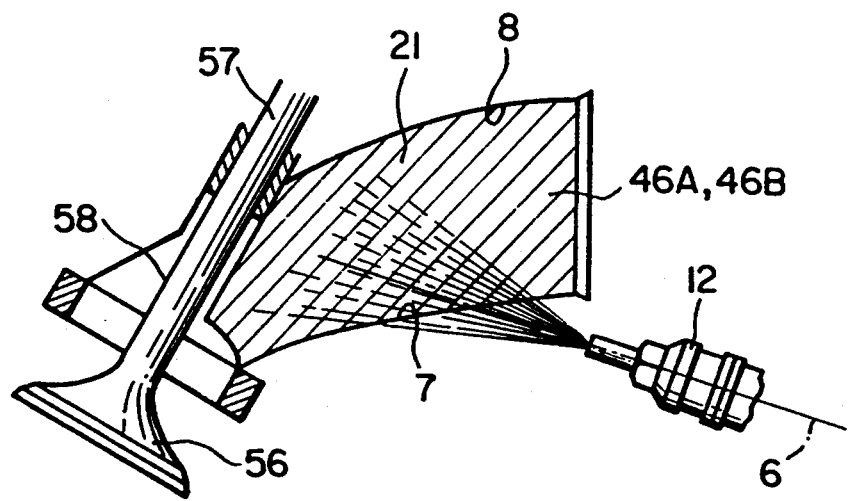
FIG. 19 is similar to FIG. 5 and illustrates the structure of each intake port of the modification shown in FIG. 18.

As indicated by the axis 6 of the injector 12 in FIGS. 18 and 19, the injector 12 injects fuel from a lower side of the intake port 46 toward obliquely upper parts of the intake ports 46A,46B on the downstream sides of the intake ports 46A,46B. The fuel injected obliquely and upwardly is inducted into the combustion chamber 30 through the intake port 46 and then through the central passages 4 within the intake ports 46A,46B.

Figure 20:
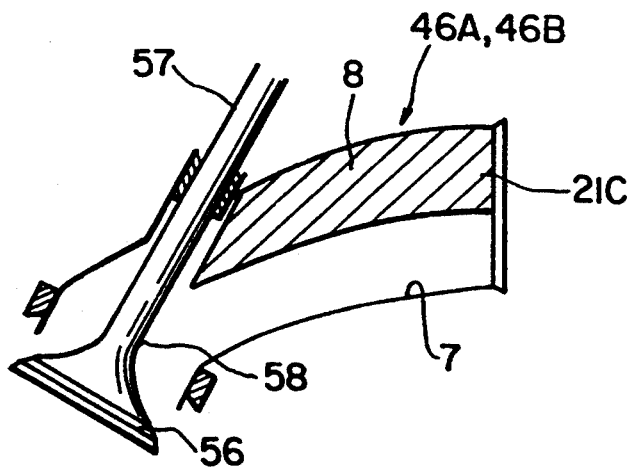
FIG. 20 is a schematic fragmentary cross-sectional view of a modification of the intake port depicted in FIG. 19.

In FIG. 20, a partition 21C is suspended from the side of the upper wall of the intake port in place of the partition 21 of FIG. 19 so that the partition 21C is provided only in a top half portion of the intake port. According to the modifications depicted in FIGS. 19 and 20, respectively, the fuel is injected toward the inner wall 8 on the upper side along the injecting axis 6 of the injector. The tumble flow Fm of the air-fuel mixture, said tumble flow Fm being formed in the vicinity of the spark plug 11, is richer in fuel than the tumble flows Fa on the outer sides of the tumble flow Fm. Leaner burn can therefore be established stably.

Figure 21:
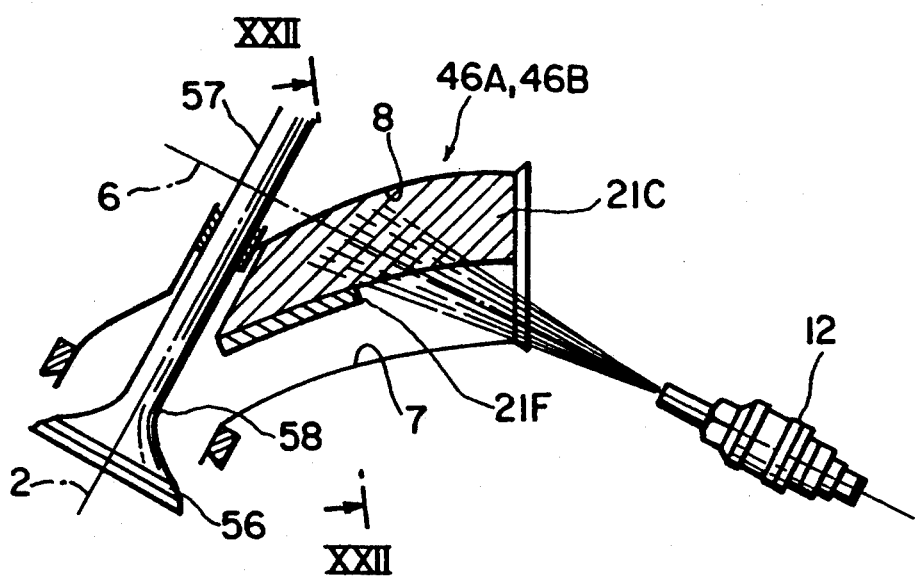
FIG. 21 is a schematic fragmentary cross-sectional view of a modification of the intake port shown in FIG. 20.
Figure 22:
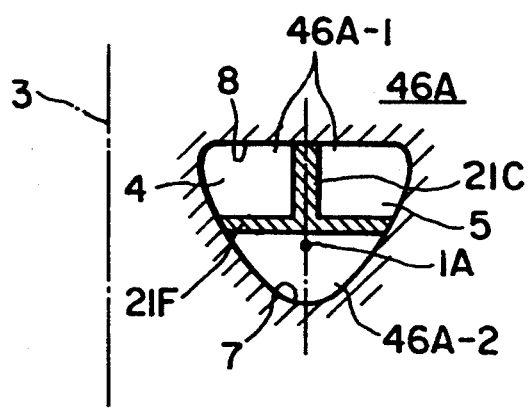
FIG. 22 is a schematic fragmentary transverse cross-sectional view of the intake port shown in FIG. 21, taken in the direction of arrows XXII—XXII of FIG. 21.

As is shown in FIGS. 21 and 22, the partition 21C is provided on the side of a top half portion of each of the intake port 46 and the intake ports 46A,46B so that only the upper half portion is horizontally divided into two sections. Further, each partition 21C is provided along a lower edge thereof with a substantially horizontal partition 21F as an auxiliary wall so that the corresponding one of the intake port 46 and intake ports 46A,46B is vertically divided into two sections. By the partition 21F, the interiors of the intake ports 46A,46B are divided into the upper half portions 46A-1,46B-1 and the lower half portions 46A-2,46B-2. Further, the upper half portions 46A-1,46B-1 are each divided by the corresponding partition 21C into two sections, namely, into the central passage 4 (on a side of the spark plug) and the side passage 5 (on a side away from the spark plug). The injector 12 is arranged so that the fuel is injected to a part above the partition 21F inside the central passage 4 of each of the intake ports 46A,46B. As a result, an outside of the tumble flow Fm of the air-fuel mixture is formed of an air-fuel mixture containing the fuel at a high concentration. This rich air-fuel mixture is caused to center around the spark plug 11. It is therefore possible to achieve stable burning even with a leaner air-fuel mixture.

Figure 23:
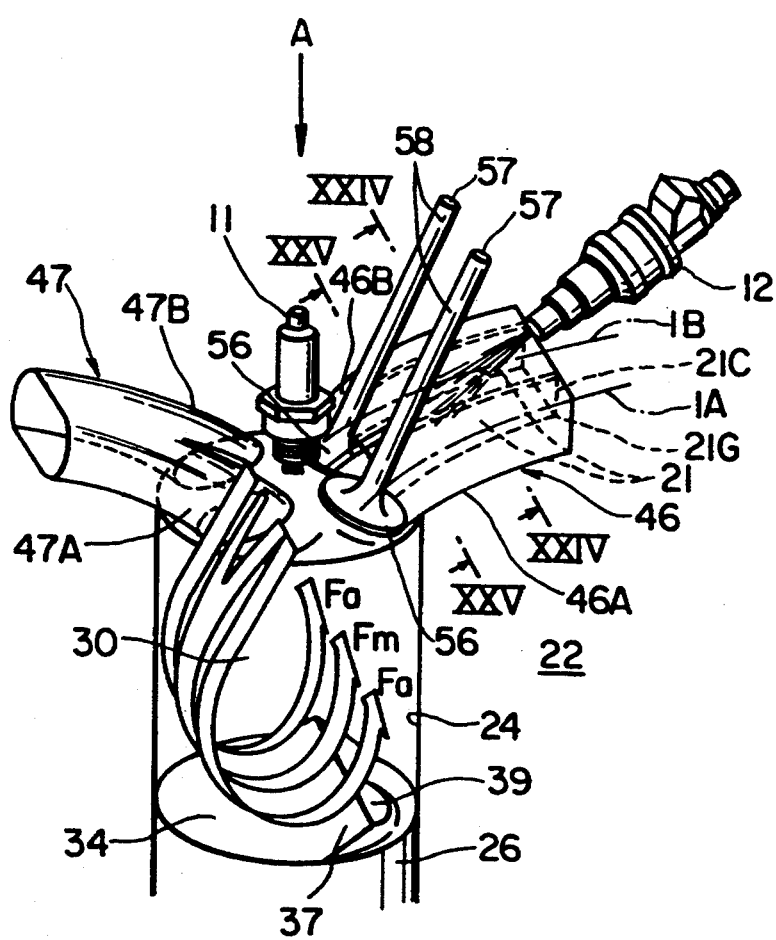
FIG. 23 is similar to FIG. 1 and illustrates a further modification of the stratified burning internal combustion engine according to the first embodiment of the present invention.
Figure 24:
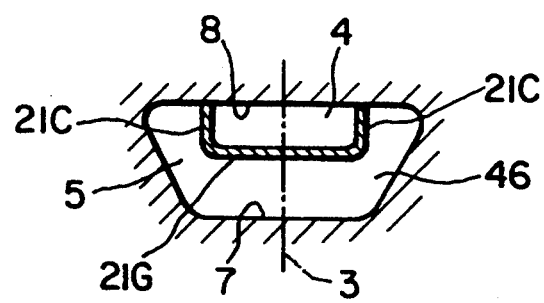
FIG. 24 is a schematic fragmentary cross-sectional view of each intake port of the further modification, taken in the direction of arrows XXIV—XXIV of FIG. 23.
Figure 25:
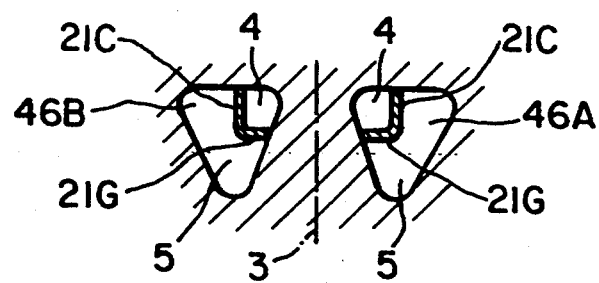
FIG. 25 is a schematic fragmentary transverse cross-sectional view of a further modification of the intake port shown in FIG. 23, taken in the direction of arrows XXV—XXV of FIG. 23.

In FIGS. 23 through 25, an auxiliary partition 21G is provided in place of the auxiliary partition 21F depicted in FIGS. 21 and 22. It is however to be noted that the injector 12 is arranged, as in the first embodiment, on the upper wall of the intake port 46 and on the upstream side of the bifurcation 46C. An upstream end of the partition 21G extends close to the position of injector 12 like the vertical partitions 21C. The horizontal partition 21G prevents the fuel, which has been injected through the injector 12, from spreading downwardly in the intake port 46. Namely, on the side upstream of the bifurcation 46C in the intake port 46, the intake port 46 is constructed such that a central passage 4 having, for example, such a rectangular cross-section as in FIG. 24 is provided in an upper part of the intake port 46. Namely, the interior of the intake port 46 is divided into the central passage 4 and a side passage 5. On the side downstream of the bifurcation 46C, the central passage 4 is divided into two sections and is formed at upper parts of the respective intake ports 46A,46B and on the side of a base plane 3. As a consequence, the fuel injected toward a lower part of each of the intake ports 46A,46B is prevented from flowing into the corresponding side passage 5 owing to the provision of the horizontal partition 21G arranged in the intake ports 46A,46B. The fuel so injected hence flows into the central passage 4 in each of the upper half portions 46A-1,46B-1, and only air flows into the side passage 5. Since the partition 21G is provided extending from the point upstream of the nozzle of the injector 12 toward the downstream side, the fuel can be allowed to flow into the central passage 4 in the upper half portion of each of the intake ports 46A,46B. An outer side of the tumble flow Fm of an air-fuel mixture is therefore formed of an air-fuel mixture containing the fuel at a high concentration, which is centered around the spark plug 11. As a result, the air-fuel mixture is ignited and burnt as a whole without failure inside the combustion chamber, thereby making it possible to achieve stable combustion with an air-fuel mixture leaner than that employed conventionally.

Next, modifications of the injection by the injector 12 will be described with reference to FIGS. 26(a) to 26(d).

Figure 26A:
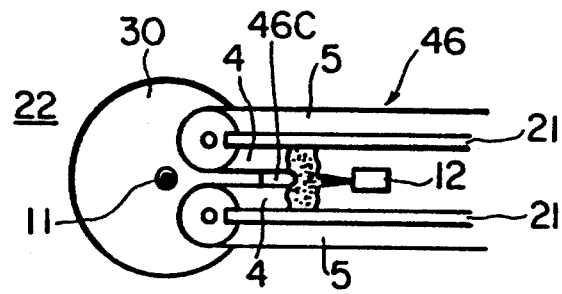
FIGS. 26(a) through 26(d) schematically illustrate various types of fuel injections in each intake port.

In FIG. 26(a), fuel is injected toward the bifurcation 46C of the Siamese intake port 46. After the fuel is caused to strongly hit the bifurcation 46C, the fuel so spread is allowed to flow into the central passages 4 of the intake ports 46A,46B. The bifurcation 46C of the intake port 46 has a surface, which extends substantially at a right angle relative to the injecting direction of the injector 12 so that fuel injected through the injector 12 can strongly hit the surface and can then spread.

Figure 26B:
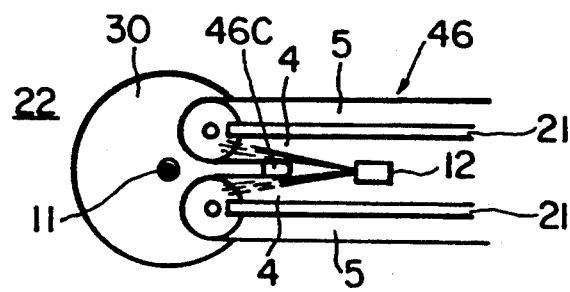

FIG. 26(b) illustrates an intake port of the type that an injector 12 having two fuel nozzles is employed. Two fuel flows, which have been injected through the respective fuel nozzles, are allowed to directly enter central passages of respective intake ports 46A,46B. In the illustrated modification, a bifurcation 46C of the intake port, which is designated by numeral 46, is formed to have a curved surface so that the flow resistance to an air flow inducted has been reduced.

Figure 26C:
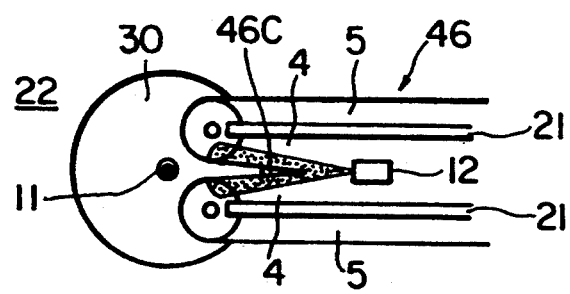

FIG. 26(c) shows an intake port of the type that, in order to avoid adhesion of fuel on the respective partitions 21,21, fuel is injected directly into central passages 4 through the injector 12 having only one fuel nozzle. In the illustrated modification, a bifurcation 46C of the intake port, which is designated by numeral 46, is formed in an acute angle so that the fuel can be inducted smoothly together with intake air.

Figure 26D:
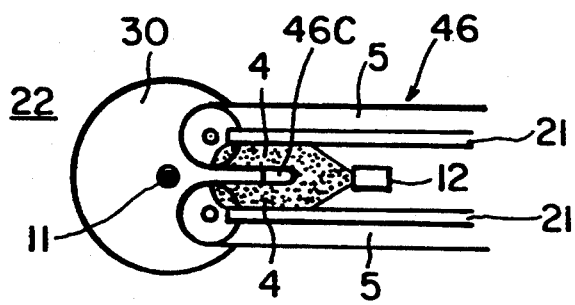

FIG. 26(d) depicts an intake port of the type that, opposite to the intake port shown in FIG. 26(c), an injector designed to inject fuel over a wide angle up to the respective partitions 21,21 is employed. In the illustrated modification, a bifurcation 46C of the intake port, which is identified by numeral 46, is rounded to have a curved surface for lower resistance as in the intake port depicted in FIG. 26(b).

FIGS. 26(a) through 26(d) show the modifications of the injection by the injector 12. The position and axis 6 of each injector 12 are both identical to those in the first embodiment.

A modification of the arrangement of the valve stem 57 and the partitions 21 will next be described with reference to FIGS. 27 to 29.

As has been described above, the partitions 21 in the first embodiment of the present invention are formed thin as shown in FIG. 6. This is to have the inner surface 121A of each partition 21 set back toward the corresponding side passage 5 from the inner surface of the corresponding valve stem 57. This can bring about the advantageous effect that a spray of fuel in an air-fuel mixture flowing along the surface 121A of each partition 21 are centered around the spark plug 11 in such directions as shown by P in FIG. 6.

Figure 27:
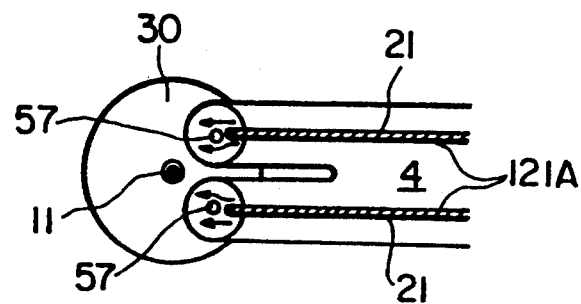
FIG. 27 is a schematic top plan view of a modification of a partition in each intake port useful in the practice of the present invention.
Figure 28:
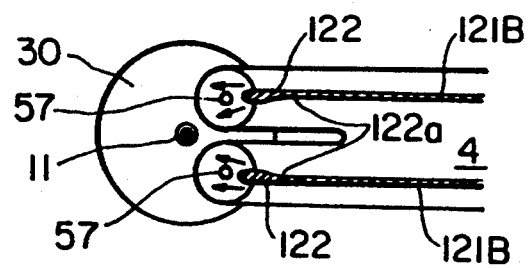
FIG. 28 is a schematic top plan view of a further modification of the partition of FIG. 27.

In an arrangement depicted in FIG. 27, with a view toward obtaining a similar advantageous effect as in the first embodiment, the inner wall of each partition 21 is set back toward the corresponding side passage 5 from the inner surface of the corresponding valve stem 57 and the central axis itself of the partition 21 is also set back toward the side passage 5 from the axis of the valve stem 57.

Figure 29:
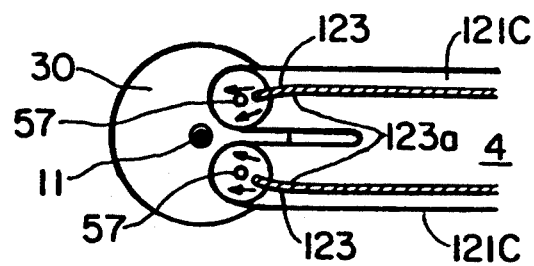
FIG. 29 is a schematic top plan view of a still further modification of the partition of FIG. 27.

Arrangements such as those illustrated in FIGS. 29 and 29, respectively, can also be contemplated. Partitions 121B,121C are each set back outwardly at an upstream portion and intermediate portion from the axis of the corresponding valve stem 57. Further, surfaces (inner surfaces) 122a,123a of downstream portions 122,123 of the partitions 121B,121C, said surfaces being on a side of the spark plug 11, are inclined toward a central axis of the central passage 4 so that an inducted air flow is directed toward the spark plug 11. According to this arrangement, the inducted air flow is more smoothly directed toward the spark plug 11 to further promote lean burn of an engine. This arrangement is therefore extremely effective for stratified burning engines. In the arrangement shown in FIG. 28, only the inner surfaces 122a of the partitions 121B are bent and outer surfaces of the partitions 121B are formed flat. In the arrangement depicted in FIG. 29, the thickness of each partition 121C is set substantially at a constant value over the entire length thereof, and not only an inner surface 123a but also an outer surface of each partition 121C are formed in a bent configuration.

By setting back at least an inner surface of each partition from the inner surface of an associated valve stem in a direction away from an associated spark plug or causing an inner surface itself of a downstream end portion of each partition to incline toward an associated spark plug as described above, it is possible to achieve centralization of a spray of fuel in an air-fuel mixture, which flows along the inner surface of the partition, toward the side of the spark plug. The degree of this centralization of the air-fuel mixture toward the side of the spark plug varies depending, for example, on the extent of set-back of each inner surface and/or the setting of inclination of each inner surface, so that the degree of stratification in the combustion chamber can be adjusted.

Figure 30:
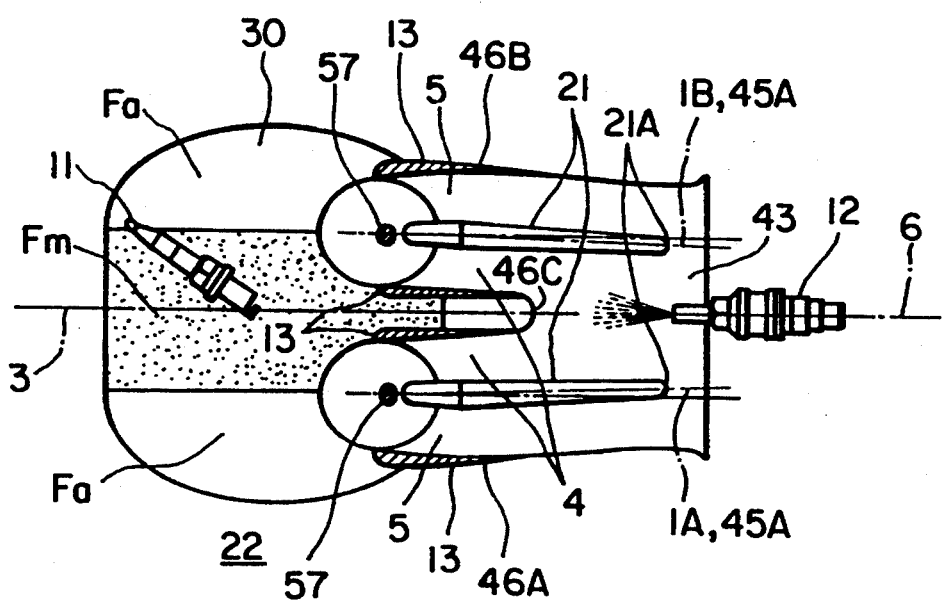
FIG. 30 is a schematic top plan view of a still further modification of the partition of FIG. 27.

A variation of the structure of the partitions, said structure controlling the direction of an intake air flow inducted through the intake port 46, will next be described with reference to FIG. 30.

In the first embodiment, the inner surface and outer surface of each partition 21 are formed substantially in parallel with each other because the configuration of the partition was simplified in view of its production. In view of the primary functions of the partitions 21 that they serve to straighten air flows inducted through the intake ports 46A,46B and to prevent disturbance of the air flows at the valve stems 57, it is preferred, as illustrated in FIG. 30, to form the thickness of each partition 21 thinner in a direction away from the corresponding valve stem 57 toward an upstream side and further to form it as thin as possible at the upstream end 21A. It is also preferred to form the partition 21 in such a way that the thickness of the partition 21 becomes substantially equal to the outer diameter of the valve stem 57 as the partition 21 downwardly approaches the valve stem 57. By constructing each partition 21 as described above, each inducted air flow can smoothly enter the combustion chamber 30 without disturbance by the partition 21 and/or the valve stem 57.

A still further modification of the intake port 46 and an intake manifold 14 connected to the upstream end of the intake port 46 will be described next with reference to FIGS. 31 through 33.

As has been described above, the upper half portions 46A-1,46B-1 of the intake ports 46A,46B are formed wider than the lower half portions 46A-2,46B-2 in the first embodiment of the present invention. By additionally improving the configuration of the intake manifold connected to the upstream end of the intake port 46, still stronger tumble flows Fa,Fm can be obtained in the combustion chamber 30.

Figure 31:
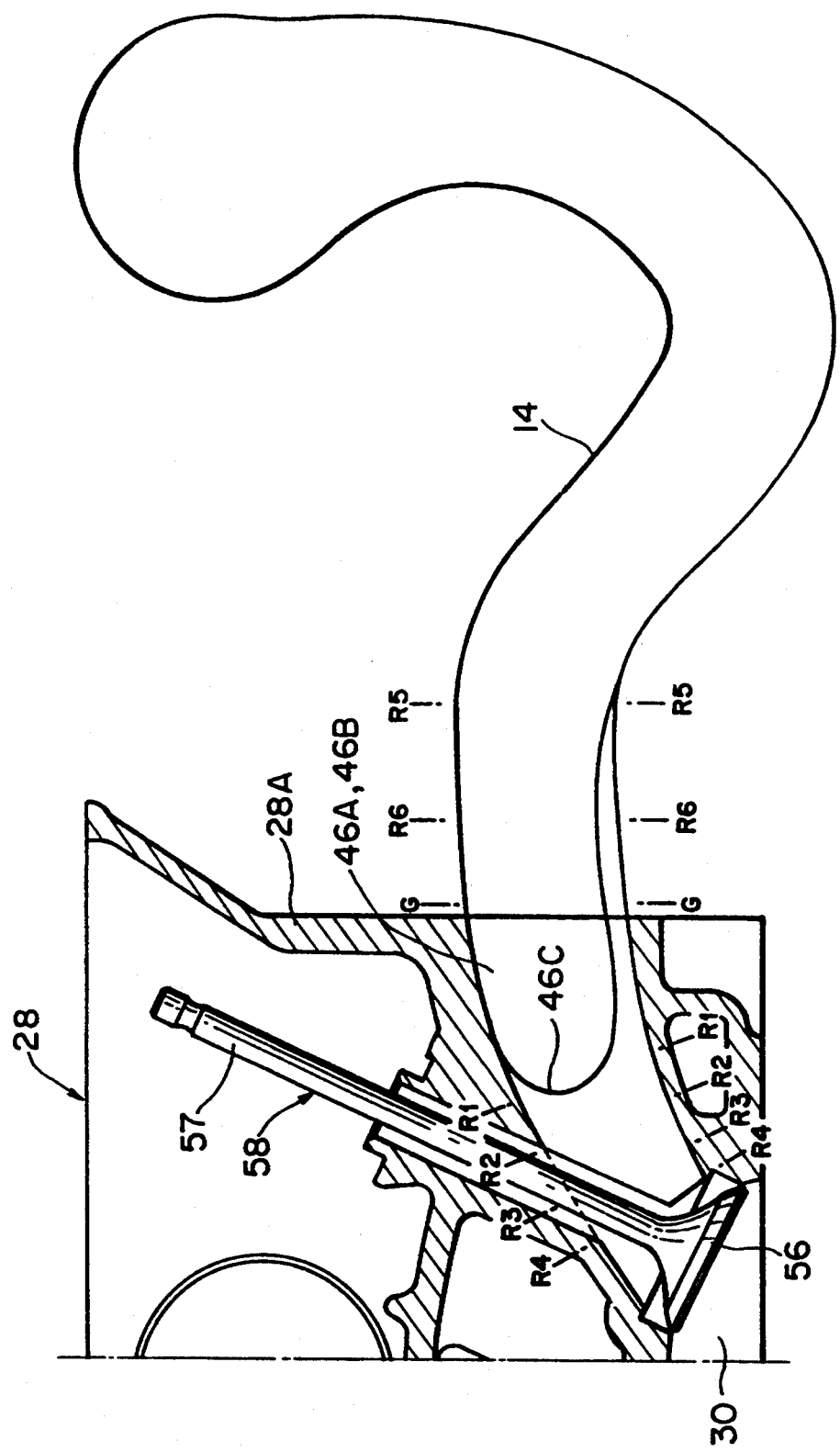
FIG. 31 is a schematic view of an intake passage useful in the practice of the present invention, and illustrates a modification of the intake passage of FIG. 7.
Figure 32A:
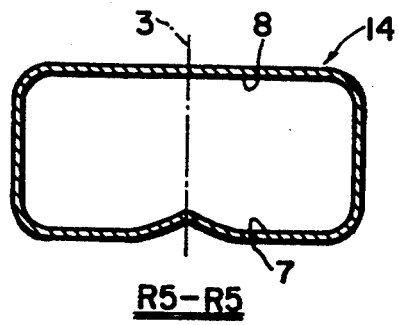
FIGS. 32(a) through 32(g) are schematic cross-sectional views of the intake passage of FIG. 31, and correspond to R1—R1 to R6—R6 and G—G cross-sections in FIG. 31, respectively.
Figure 32B:
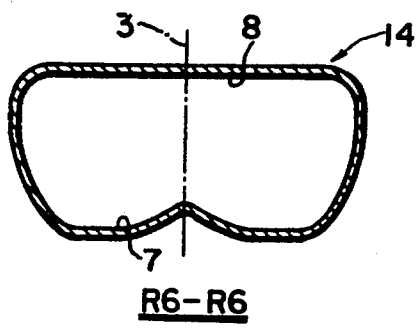
Figure 32C:
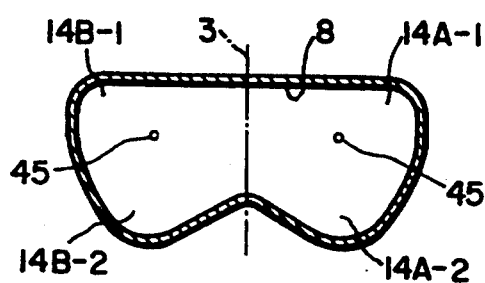
Figure 32D:
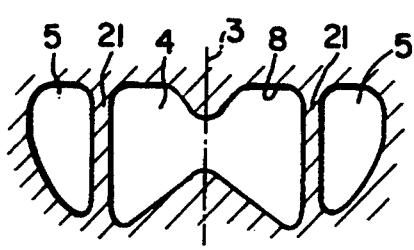
Figure 32E:
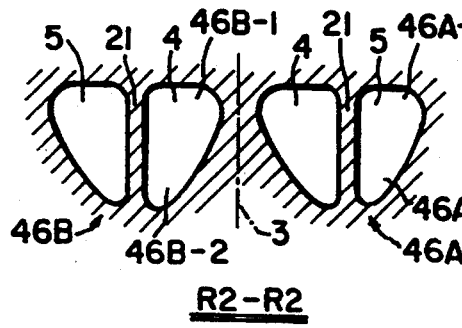
Figure 32F:
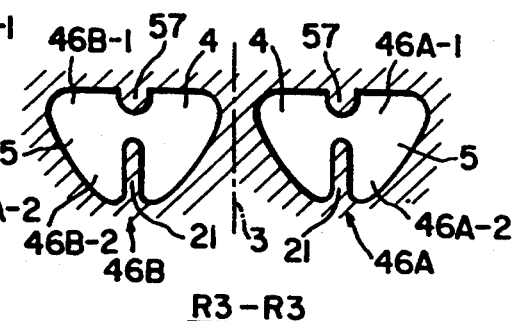
Figure 32G:
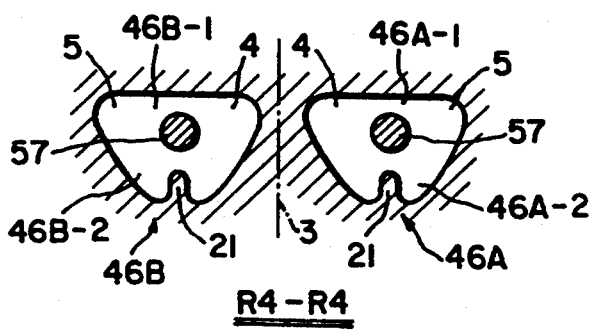

In FIG. 31, numeral 14 indicates the intake manifold connected to the upstream end of the intake port 46 which is fixed on the side wall 28A of the cylinder head 28. The cross-sectional shapes of various parts of the intake port 46 and intake manifold 14 are as illustrated in FIG. 32. With a view toward permitting smooth entrance of inducted air into the respective intake ports 46A,46B, in other words, with a view toward avoiding any appreciable reduction in the flow velocity of inducted air, the cross-sectional configuration of the intake manifold 14 is gradually changed from the upstream end to the downstream end as shown in FIGS. 32(a) through 32(c). At the downstream end where the intake manifold 14 is connected to intake passages 14A,14B [see FIG. 32(c)], the intake manifold 14 is formed to have substantially the same cross-sectional configuration as the intake ports 46A,46B.

Owing to the provision of the two intake passages 14A,14B, the interior of the intake manifold 14 is formed to become more flattened toward the downstream end thereof so that, like the cross-sectional configuration of the individual intake ports 46A,46B, upper half portions 14A-1,14B-1 are more widened relative to the lower half portions 14A-2,14B-2 toward the downstream end.

The inducted air flows therefore pass through the two intake passages 14A,14B inside the intake manifold 14 with their central axes 45 displaced toward the upper half portions 14A-1,14B-1 and then enter the corresponding intake ports 46A,46B. Formation of tumble flows within the combustion chamber 30 is therefore promoted further.

Figure 33:
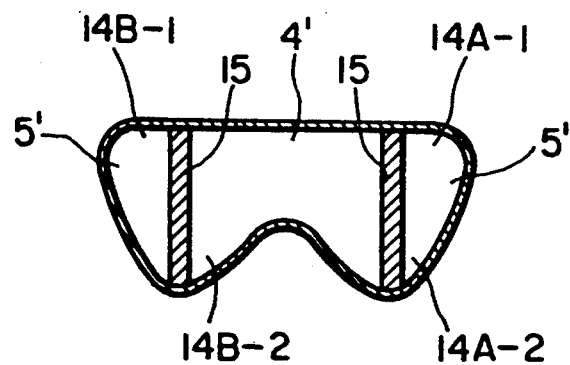
FIG. 33 is similar to FIG. 32(c) and illustrates a further modification of the intake passage of FIG. 31.

Although the partitions are disposed only inside the intake port in the first embodiment, it is also possible, as shown in FIG. 33, to provide the intake manifold 14 with such partitions 15,15 as horizontally dividing each of the individual intake passages 14A,14B into two sections. These partitions 15 are provided extending from upper walls to lower walls of the respective intake passages 14A,14B. By the partitions 15, the interiors of the intake passages 14A,14B are each divided into a central passage 4' and a side passage 5'. The partitions 15 are provided extending close to the downstream end of the intake manifold 14, in other words, a face where the intake manifold 14 is connected to the intake ports 46A,46B. By the partitions 15, the intake manifold 14 and the intake port 46 divide inducted air into the central passages 4,4' and the side passages 5,5'. The intake air flows branched into the central passages 4,4' and the side passages 5,5' are hence completely separated into an air-fuel mixture and air, so that the stratification of the tumble flows Fa,Fm inside the combustion chamber 30 is enhanced further.

Figure 34:
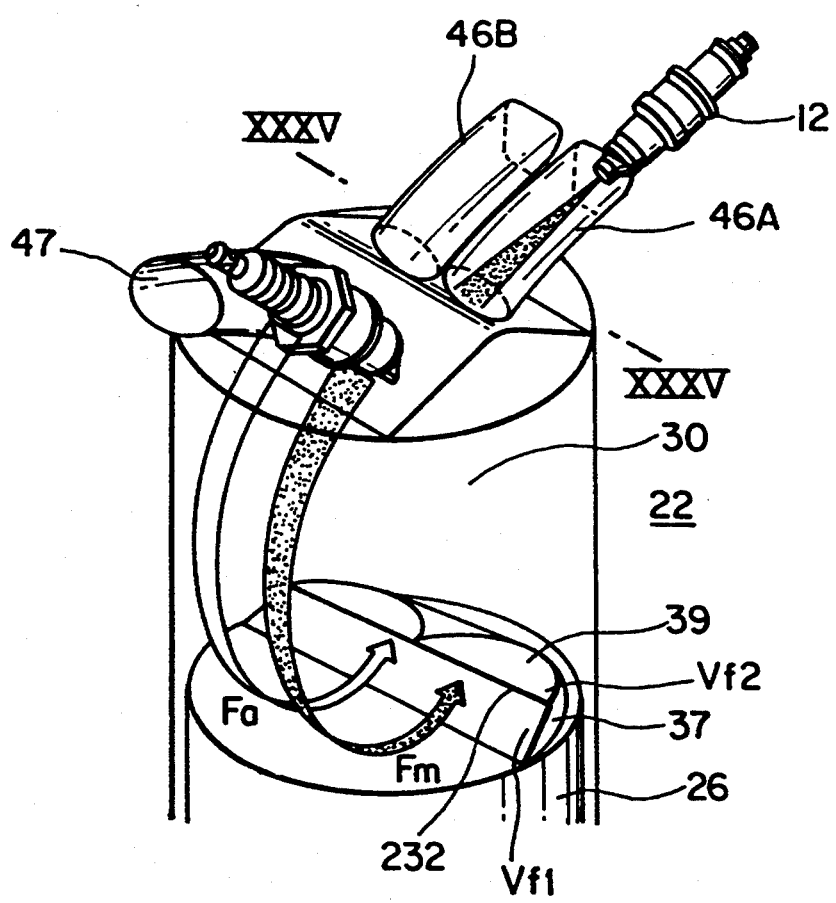
FIG. 34 is a schematic perspective view of the stratified burning internal combustion engine according to the second embodiment of the present invention, in which intake ports having no partition have been incorporated.
Figure 35:
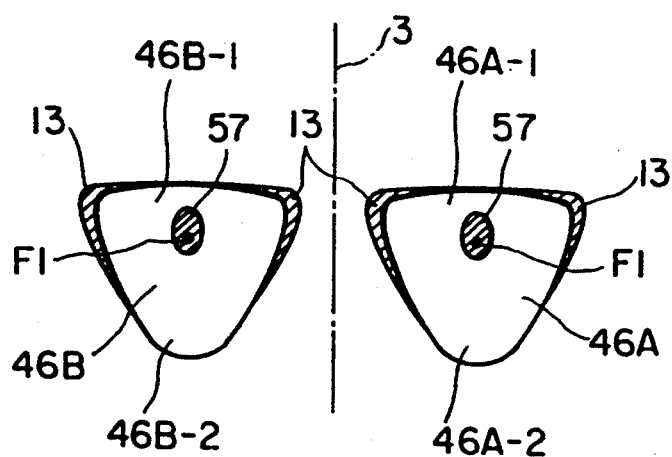
FIG. 35 is a schematic transverse cross-sectional view of the intake ports, taken in the direction of arrows XXXV—XXXV on FIG. 34.
Figure 36:
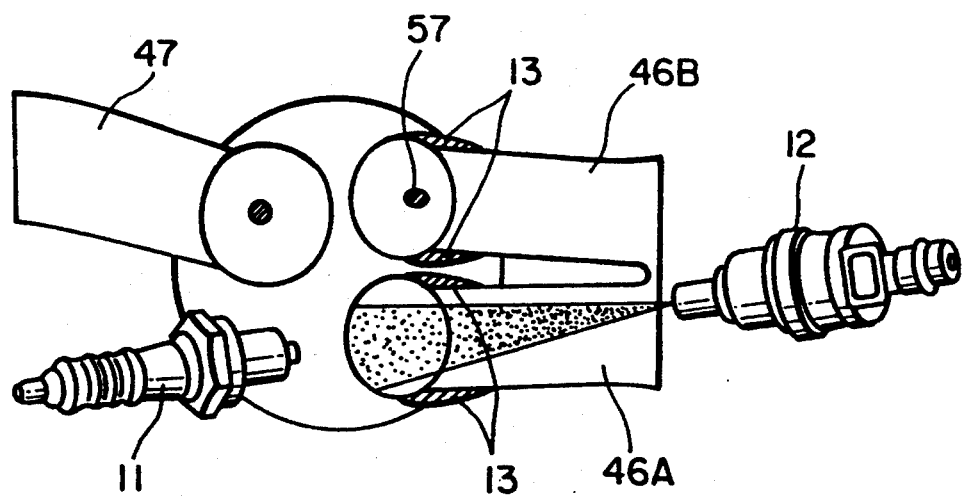
FIG. 36 is a schematic top plan view of the stratified burning internal combustion engine of FIG. 34.

With reference to FIGS. 34 through 36, a description will next be made of the second embodiment of the present invention as applied to an engine having plural intake ports in which no partition is arranged.

Figure 37:
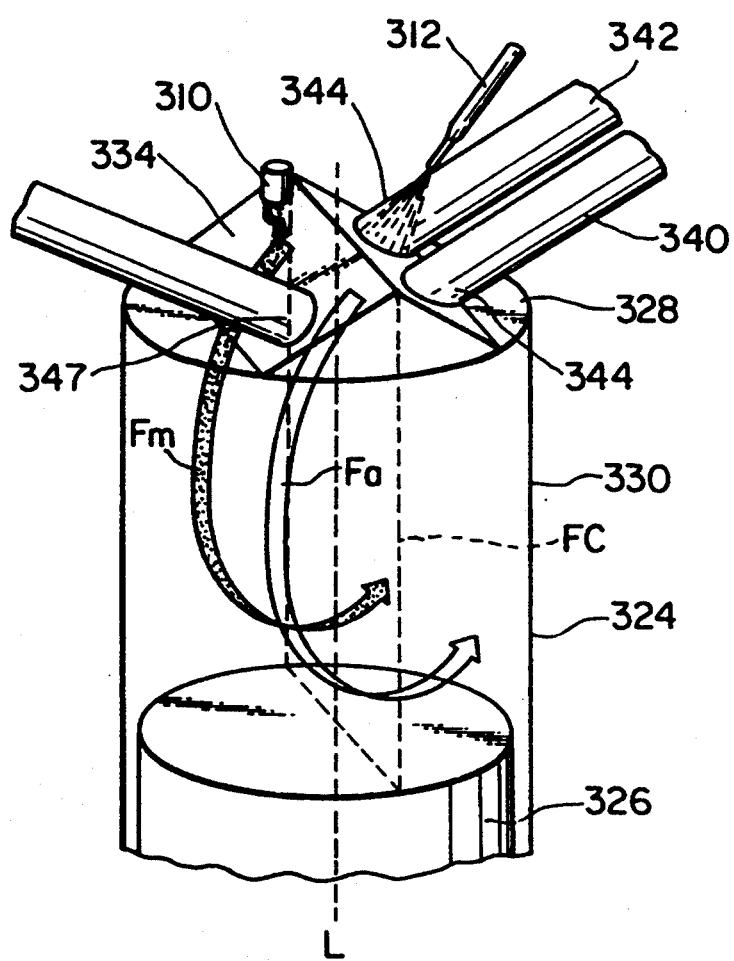
FIG. 37 is a schematic perspective view of a conventional stratified burning internal combustion. engine.
Figure 38:
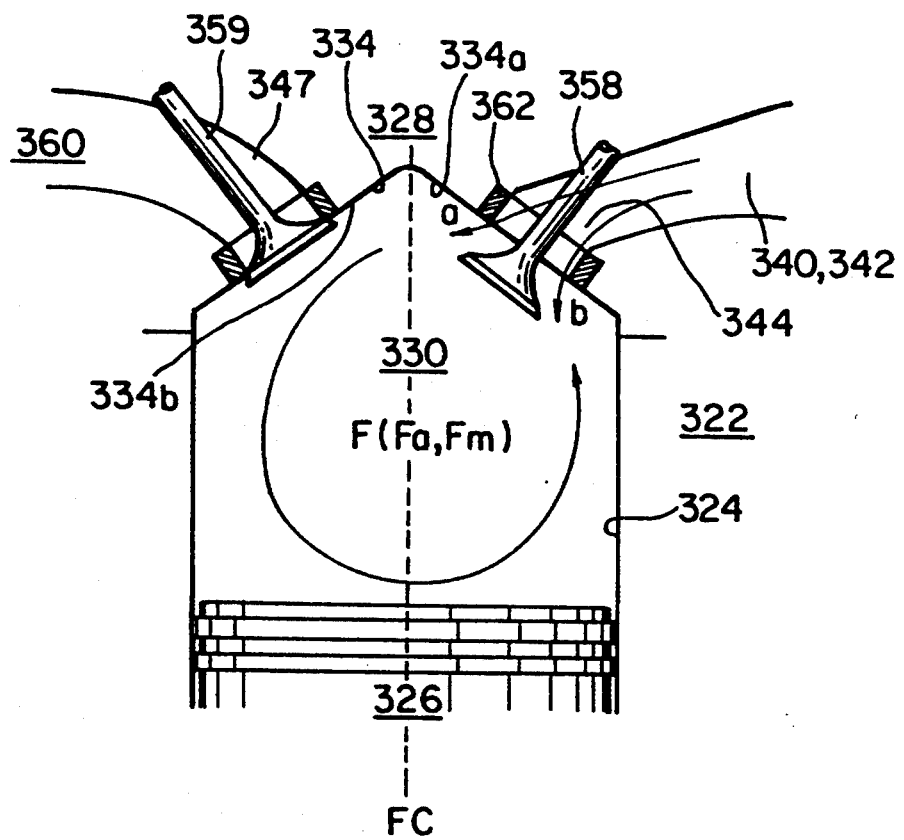
FIG. 38 is a schematic cross-sectional view of the conventional stratified burning internal combustion engine of FIG. 37.

FIG. 34 illustrates the stratified burning internal combustion engine according to the second embodiment, which has basically the same construction as the stratified burning internal combustion engine shown in FIGS. 37 and 38 except for the configuration of a top wall of a piston 26 and the configuration of intake ports 46A,46B.

As the configuration of the top wall of the piston 26, the configuration shown in FIGS. 1, 4(a) and 4(b) or that illustrated in FIGS. 15(a) and 15(b) can be adopted. The cross-sectional configuration of the intake ports 46A,46B is, as illustrated in FIGS. 34 and 35, an inverted, substantially triangular configuration with upper half portions being more widened than lower half portions. The intake ports 46A,46B have a substantially straight configuration as a whole and are bent significantly in the proximity of intake openings to the combustion chamber 30. As shown in FIG. 36, the intake ports 46A,46B are each provided in the upper half portion of the bent portion thereof with inflated parts 13,13 so that the intake port has a greater inner diameter than the intake opening of the corresponding intake port.

As a result, an air-fuel mixture and air are allowed to flow into the combustion chamber 30 from the intake port 46A and the intake port 46B, respectively, while forming tumble flows sufficient for lean burn and also securing a sufficient intake flow rate. It is therefore possible to improve the combustion stability, combustion efficiency and output power over conventional lean-burn internal combustion engines.

Incidentally, the present invention can also be applied to internal combustion engines having three or more intake valves per cylinder. In the case of an internal combustion engine equipped with three intake valves per cylinder, for example, an injector is provided in such a way that fuel can be injected toward an intake port associated with the central intake valve. This arrangement makes it possible to form stratified tumble flows similar to the tumble flows Fa,Fm,Fa in the first embodiment. By constructing the remaining elements as in the first embodiment or in one of the modifications of the first embodiment, it is possible to bring about similar advantageous effects to those described above in connection with the first embodiment and its modifications.

The embodiments and their modifications described above are each constructed to form the tumble flow Fm of an air-fuel mixture and the tumble flows Fa of air inside the combustion chamber 30. The present invention is however not limited to such embodiments. For example, it is possible to construct a stratified burning internal combustion engine in such a manner that fuel is also supplied to the tumble flows Fa of air to form, instead of the tumble flow Fa, tumble flows having a smaller air-fuel ratio than the tumble flow Fm.

We claim:

1. A stratified burning internal combustion engine comprising:
   a combustion chamber defined by an inner wall of a cylinder, a top wall of a piston fitted in the cylinder and a lower wall of a cylinder head,
   a spark plug disposed on the inner wall of the combustion chamber,
   intake air feed means having plural intake openings each of which is arranged in the lower wall of the cylinder head on one side of an imaginary plane, said imaginary plane containing a longitudinal axis of the cylinder, and is selectively opened or closed by an associated intake valve, respectively, whereby intake air is allowed to flow in through the intake openings and then to flow further along the lower wall of the cylinder head from said one side of the imaginary plane to the opposite side at a right angle relative to the imaginary plane as viewed in plan so that mutually-parallel plural tumble flows are formed in the same direction within substantially the entirety of the combustion chamber, and
   fuel feed means for feeding fuel into intake air in said intake air feed means, said intake air being to form one of said plural tumble flows at a location corresponding to the spark plug, whereby stratified tumble flows are caused to exist in the combustion chamber during an intake stroke;
   wherein the top wall of the piston has at least one inclined wall extending along the direction of flow of the plural tumble flows to promote the stratified tumble flows, said inclined wall having a top thereof on said one side of the imaginary plane.

2. The engine of claim 1, wherein the top wall of the piston is provided with a recess located adjacent to the raised portion on the side of the imaginary plane and the recess has a surface smoothly extending in continuation with the inclined wall of the raised portion.

3. The engine of claim 1, wherein the top wall of the piston has a squishing portion at a location farther from the imaginary plane than a top end of the inclined wall so that the squishing portion develops squishing in cooperation with a ceiling of the combustion chamber near top dead center during a compression stroke of the piston.

4. The engine of claim 1, wherein a line resulting from intersection between a plane, which extends in parallel with the imaginary plane, and the inclined wall is substantially a straight line.

5. The engine of claim 1, wherein a valve recess is formed in the raised portion at a part farther from the imaginary plane than a top end of the inclined wall of the raised portion so that interference between the top wall of the piston and the intake valves, said intake valves being adapted to selectively open or close the associated intake openings, is prevented.

6. The engine of claim 5, wherein the part of the raised portion, said part being farther from the imaginary plane than the inclined wall of the raised portion, cooperates with a ceiling of the combustion chamber near top dead center during a compression stroke of the piston so that squishing is caused to occur.

7. The engine of claim 1, wherein the inclined wall is formed by a wall of a recess which is in turn formed in the top wall of the piston.

8. A stratified burning internal combustion engine comprising:
a combustion chamber defined by an inner wall of a cylinder, a top wall of a piston fitted in the cylinder and a lower wall of a cylinder head,
a spark plug disposed centrally on the lower wall of the cylinder head,
an intake port having two intake openings each of which is arranged in the lower wall of the cylinder head on one side of an imaginary plane, said imaginary plane containing a longitudinal axis of the cylinder, and is selectively opened or closed by an associated intake valve, whereby intake air is allowed to flow in through the intake openings and then to flow further along the lower wall of the cylinder head from said one side of the imaginary plane to the opposite side at a right angle relative to the imaginary plane as viewed in plan so that mutually-parallel tumble flows are formed in the same direction within substantially the entirety of the combustion chamber,
at least one partition disposed extending from a top inner wall to a lower inner wall of the intake port to divide the intake port into plural sections, whereby the tumble flows are divided into a like plural number of mutually-parallel tumble flows, and
fuel feed means for feeding fuel into intake air, said intake air being to form one of said plural number of divided tumble flows at a location corresponding to the spark plug, whereby stratified tumble flows are caused to exist in the combustion chamber during an intake stroke.

9. The engine of claim 8, wherein the inclined wall is defined by an inclined wall of a raised portion formed on a top wall of the piston with a top of said raised portion being located on at least said one side of the imaginary plane, and the inclined wall of the raised portion is located on a side of the imaginary plane.

10. The engine of claim 9, wherein the raised portion has the top only on the one side of the imaginary plane.

11. The engine of claim 9, wherein the raised portion has the top only on the opposite side of the imaginary plane.

12. The engine of claim 9, wherein the raised portion has the top on both the one and opposite sides of the imaginary plane.

13. The engine of claim 9, wherein the top wall of the piston is provided with a recess located adjacent to the raised portion on the side of the imaginary plane and the recess has a surface smoothly extending in continuation with the inclined wall of the raised portion.

14. The engine of claim 9, wherein the top wall of the piston has a squishing portion at a location farther from the imaginary plane than a top end of the inclined wall so that the squishing portion develops squishing in cooperation with a ceiling of the combustion chamber near top dead center during a compression stroke of the piston.

15. The engine of claim 9, wherein a line resulting from intersection between a plane, which extends in parallel with the imaginary plane, and the inclined wall is substantially a straight line.

16. The engine of claim 9, wherein a valve recess is formed in the raised portion at a part farther from the imaginary plane than a top end of the inclined wall of the raised portion so that interference between the top wall of the piston and the intake valves, said intake valves being adapted to selectively open or close the associated intake openings, is prevented.

17. The engine of claim 9, wherein the part of the raised portion, said part being farther from the imaginary plane than the inclined wall of the raised portion, cooperates with a ceiling of the combustion chamber near top dead center during a compression stroke of the piston so that squishing is caused to occur.

18. The engine of claim 9, wherein the inclined wall is formed by a surface of a recess which is in turn formed in the top wall of the piston.

19. The engine of claim 8, wherein the upper wall of the piston has at least one inclined wall extending along the direction of the stratified tumble flows to promote the stratified tumble flows.

20. A stratified burning internal combustion engine comprising:
a combustion chamber defined by an inner wall of a cylinder, a top wall of a piston fitted in the cylinder and a lower wall of a cylinder,
a spark plug disposed in a ceiling of the combustion chamber,
plural intake ports having plural intake openings each of which is arranged in the lower wall of the cylinder head on one side of an imaginary plane, said imaginary plane containing a longitudinal axis of the cylinder, and is selectively opened or closed by an associated intake valve, said plural intake ports extending in parallel with each other toward said plural intake openings, whereby intake air is allowed to flow in through the intake openings and then to flow further along the lower wall of the cylinder head from said one side of the imaginary plane to the opposite side at a right angle relative to the imaginary plane as viewed in plan so that mutually-parallel tumble flows are formed in the same direction within substantially the entirety of the combustion chamber, and fuel feed means for feeding fuel into intake air, said intake air being to form one of said plural tumble flows at a location corresponding to the spark plug, whereby stratified tumble flows are caused to exist in the combustion chamber during an intake stroke;

wherein the top wall of the piston has at least one inclined wall extending along the direction of the stratified tumble flows to promote the stratified tumble flows.

21. The engine of claim 20, wherein the inclined wall is defined by an inclined wall of a raised portion formed on a top wall of the piston with a top of said raised portion being located on at least said one side of the imaginary plane, and the inclined wall of the raised portion is located on a side of the imaginary plane.

22. The engine of claim 21, wherein the top wall of the piston is provided with a recess located adjacent to the raised portion on the side of the imaginary plane and the recess has a surface smoothly extending in continuation with the inclined wall of the raised portion.

23. The engine of claim 21, wherein the top wall of the piston has a squishing portion at a location farther from the imaginary plane than a top end of the inclined wall so that the squishing portion develops squishing in cooperation with a ceiling of the combustion chamber near top dead center during a compression stroke of the piston.

24. The engine of claim 21, wherein a line resulting from intersection between a plane, which extends in parallel with the imaginary plane, and the inclined wall is substantially a straight line.

25. The engine of claim 21, wherein a valve recess is formed in the raised portion at a part farther from the imaginary plane than a top end of the inclined wall of the raised portion so that interference between the top wall of the piston and the intake valves, said intake valves being adapted to selectively open or close the associated intake openings, is prevented.

26. The engine of claim 21, wherein the part of the raised portion, said part being farther from the imaginary plane than the inclined wall of the raised portion, cooperates with a ceiling of the combustion chamber near top dead center during a compression stroke of the piston so that squishing is caused to occur.

27. The engine of claim 20, wherein the inclined wall is formed by a surface of a recess which is in turn formed in the top wall of the piston.

* * * * *